United States Patent
Kim et al.

(10) Patent No.: US 12,112,128 B2
(45) Date of Patent: Oct. 8, 2024

(54) APPARATUS AND METHOD FOR GENERATING WORD EMBEDDING LIBRARY

(71) Applicant: KOREA ELECTRIC POWER CORPORATION, Naju-si (KR)

(72) Inventors: Sung Min Kim, Seoul (KR); Hye Won Lim, Seoul (KR); Yoon Bo Shim, Seoul (KR); Yui Ha, Seoul (KR); Yoon Seok Choi, Seoul (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 269 days.

(21) Appl. No.: 17/955,273

(22) Filed: Sep. 28, 2022

(65) Prior Publication Data

US 2024/0104300 A1    Mar. 28, 2024

(51) Int. Cl.
*G06F 40/211* (2020.01)
*G06F 40/129* (2020.01)
*G06F 40/268* (2020.01)

(52) U.S. Cl.
CPC .......... *G06F 40/211* (2020.01); *G06F 40/129* (2020.01); *G06F 40/268* (2020.01)

(58) Field of Classification Search
CPC .... G06F 40/211; G06F 40/268; G06F 40/129; G06F 40/247; G06F 40/242; G06F 40/53
See application file for complete search history.

(56) References Cited

U.S. PATENT DOCUMENTS

2011/0320468 A1* 12/2011 Child .................. G06F 16/532
707/769

FOREIGN PATENT DOCUMENTS

| KR | 20100097354 A | * | 9/2010 |
| KR | 10-2020-0088088 A | | 7/2020 |
| KR | 20200088088 A | * | 7/2020 |
| WO | WO-2022114325 A1 | * | 6/2022 |

* cited by examiner

*Primary Examiner* — Yogeshkumar Patel
(74) *Attorney, Agent, or Firm* — Foundation Law Group, LLP

(57) ABSTRACT

The present invention relates to a method of generating a word embedding library, including: receiving, by a processor, original text composed of Hangul through an input interface; segmenting, by the processor, the original text by morpheme, combining segmented morphemes step by step according to a preset rule, and matching a tag to a combination of step-by-step morphemes according to a morphological attribute or a syntactic attribute of the combination of step-by-step morphemes; and generating, by the processor, a word embedding library by classifying the morphemes included in the original text based on the tag matched to the combination of step-by-step morphemes.

20 Claims, 19 Drawing Sheets

APPARATUS AND METHOD FOR GENERATING WORD EMBEDDING LIBRARY

BACKGROUND

1. Field of the Invention

The present invention relates to an apparatus and method for generating a word embedding library, and more particularly, to a method of generating a word embedding library capable of generating a word embedding library for word embedding.

2. Discussion of Related Art

English has a structure in which words are divided by part of speech, words describing a subject are sequentially arranged around the subject, and words are vectorially aggregated with words modifying them.

On the other hand, Korean has a very complex structure such as phrases and clauses being mixed to form a matrix sentence or an embedded sentence, a main clause and a subordinate clause being complexly connected to each other, attributes of parts of speech being changed by a suffix, and a sentence being converted into a noun by a transformative ending.

As described above, since Korean has a multidimensional complex structure, for Korean, main words and supplementary words may not be considered to be vectorially aggregated. Therefore, when embedding Korean using a word embedding tool written based on English, there is a problem that the accuracy is very low.

Accordingly, there is a demand for a word embedding method capable of performing word embedding in consideration of the grammatical structure of Korean.

The background technology of the present invention is disclosed in "Apparatus and Method for Classifying Word Attribute" of Korean Patent Application Laid-Open No. 10-2020-0088088 (Jul. 22, 2020)

SUMMARY OF THE INVENTION

The present invention provides an apparatus and method for generating a word embedding library capable of generating a word embedding library for word embedding.

According to an aspect of the present invention, a method of generating a word embedding library includes: receiving, by a processor, original text composed of Hangul through an input interface; segmenting, by the processor, the original text by morpheme, combining segmented morphemes step by step according to a preset rule, and matching a tag to a combination of step-by-step morphemes according to a morphological attribute or a syntactic attribute of the combination of step-by-step morphemes; and generating, by the processor, a word embedding library by classifying the morphemes included in the original text based on the tag matched to the combination of step-by-step morphemes.

BRIEF DESCRIPTION OF THE DRAWINGS

Aspects, features, and advantages of specific embodiments of the present disclosure will become more apparent from the following description with reference to the accompanying drawings.

DETAILED DESCRIPTION OF EXEMPLARY EMBODIMENTS

Hereinafter, a method of generating a word embedding library according to embodiments of the present invention will be described in detail with reference to the accompanying drawings. In this process, thicknesses of lines, sizes of components, and the like illustrated in the accompanying drawings may be exaggerated for clearness of explanation and convenience. In addition, terms to be described below are defined in consideration of functions in the present disclosure and may be construed in different ways according to the intention of users or practice. Therefore, these terms should be defined on the basis of the content throughout the present specification.

Figure 1:
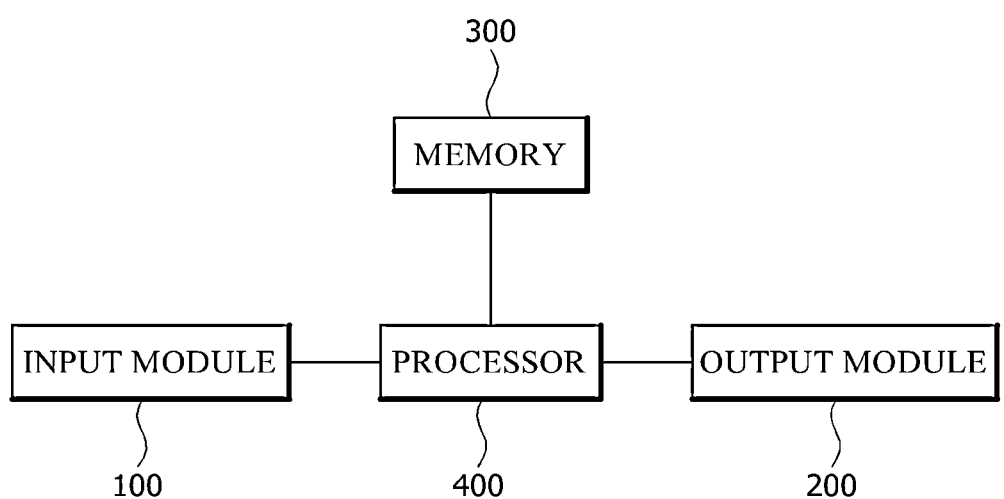
FIG. 1 is a block configuration diagram for describing an apparatus for generating a word embedding library according to an embodiment of the present invention.

FIG. 1 is a block configuration diagram for describing an apparatus for generating a word embedding library according to an embodiment of the present invention.

Referring to FIG. 1, an apparatus for generating a word embedding library according to the embodiment of the present invention may include an input interface 100, a display 200, a memory 300, and a processor 400.

The input interface 100 may receive original text composed of Hangul. That is, the input interface 100 may receive data in which the original text composed of Hangul is stored, and output the received data to the processor 400 to be described below.

The display 200 may output various results calculated in a process of the processor 400 generating a word embedding library for words included in the input original text so that a user may check the results.

Various data necessary for the processor 400 to generate a word embedding library for words included in the input original text may be pre-stored in the memory 300. In addition, various data calculated in the process of the processor 400 generating the word embedding library may be stored in the memory 300.

The processor 400 may segment the original text by morpheme, combine the segmented morphemes step by step according to a preset rule, match a tag to a combination of step-by-step morphemes according to a morphological attribute or a syntactic attribute of the combination of step-by-step morphemes, and classify the morphemes included in the original text based on the tag matched to the combination of step-by-step morphemes, thereby generating a word embedding library.

Here, the tag, which is a feature value representing a linguistic attribute of a word, may be used to convert a word into a vector form when embedding the word. The word embedding library may be a set of words (i.e., morphemes or sets of morphemes) classified according to a matched tag. The processor 400 may generate the word embedding library by classifying words included in the original text based on tags matched to the words. Thereafter, the word embedding library may be converted into a vector form and used for word embedding.

In addition, the processor 400 may determine a type of sentence included in the original text based on a tag matched to a combination of step-by-step morphemes, match a tag to a sentence according to the determined type, and classify a morpheme or a combination of morphemes included in the original text based on the tag matched to the sentence, thereby generating a word embedding library.

In addition, the processor 400 may identify a subject (category) of the original text, and classify a word embedding library according to the identified subject. The processor 400 may identify a style of the original text, classify a word embedding library according to the identified style, identify the subject and style of the original text, and classify the word embedding library according to the identified subject and style.

Figure 2:
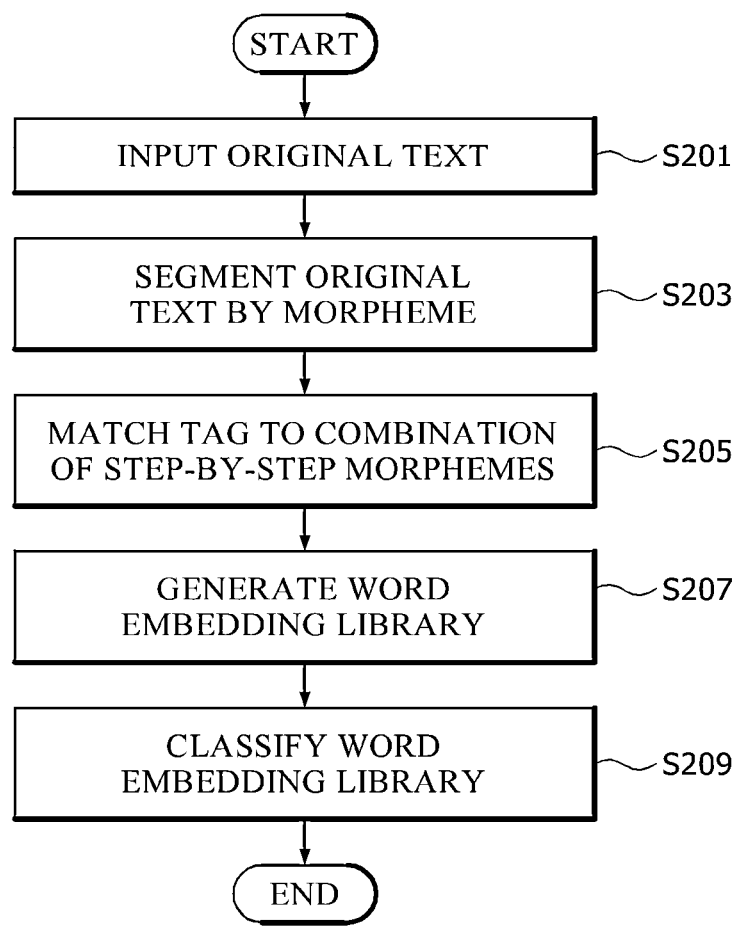
FIG. 2 is a flowchart for describing a method of generating a word embedding library according to an embodiment of the present invention.

FIG. 2 is a flowchart for describing a method of generating a word embedding library according to a first embodiment of the present invention.

Hereinafter, the method of generating a word embedding library according to the first embodiment of the present invention will be described with reference to FIG. 2.

First, the processor 400 may receive original text composed of Hangul through the input interface 100 (S201). For example, the processor 400 may receive data in which the original text composed of Hangul is stored through a storage device (e.g., Universal Serial Bus (USB)), a communication network, or an input device (e.g., a keyboard). However, the present invention is not limited to the above-described embodiment, and the processor 400 may receive the original text composed of Hangul in various ways.

Subsequently, the processor 400 may segment the original text by morpheme (S203). That is, the processor 400 may segment words included in the original text into units of morphemes. The processor 400 may segment the original text by morpheme by using a morpheme analysis engine (e.g., MeCab).

The processor 400 may combine the segmented morphemes step by step according to a preset rule, and match a tag to a combination of step-by-step morphemes according to a morphological attribute or a syntactic attribute of the combination of step-by-step morphemes (S205). The processor 400 may combine some of the morphemes step by step according to the preset rule, match a tag to a combination of step-by-step morphemes according to the morphological attribute of the combination of step-by-step morphemes, divide morphemes included in the original text by sentence component based on the combination of morphemes matched to the morphological attribute, and match a tag to the combination of morphemes according to the syntactic attribute of the combination of morphemes divided by sentence component. That is, the processor 400 may combine the segmented morphemes into a noun defined by a word, a phrase, or a clause having one nominal meaning in a sentence, and determine a sentence component of a word segment including a noun according to a part of speech of a particle or an auxiliary particle attached to the noun. As described above, the present invention may simplify a complex sentence by dividing a sentence by sentence component.

Subsequently, the processor 400 may classify a morpheme or a combination of morphemes included in the original text based on a tag matched to a combination of step-by-step morphemes to generate a word embedding library (S207). That is, the processor 400 may generate a word embedding library by combining the combinations of morphemes having the same matched tag together.

Subsequently, the processor 400 may classify a word embedding library according to a subject or a style of the original text (S209). That is, the processor 400 may identify a subject or a style of the original text, and classify a word embedding library according to the identified subject or style. The processor 400 may also classify a word embedding library according to the subject or style of the original text.

According to an embodiment, the processor 400 may receive a subject of the original text from a user, and identify the received subject as the subject of the original text. According to another embodiment, the processor 400 may classify all words included in the original text by subject, and then identify a subject including the most words as the subject of the original text. According to an embodiment, the processor 400 may determine a subject of the original text from classification items including technology, science, engineering, law, politics, economy, business, literature, novels, essays, and humanities.

According to an embodiment, the processor 400 may receive a style of the original text from a user, and identify the received style as the subject of the original text. According to an embodiment, the processor 400 may determine a style of the original text among classification items including a literary style, a colloquial style, an article style, and a modified style. According to an embodiment, the processor 400 may identify a style by sentence included in the original text, and classify sentences included in the original text according to the identified style. For example, the processor 400 may separately classify quoted sentences enclosed within double quotation marks among sentences included in the original text, and store the classified quoted sentences in a library of a colloquial style among classification items by style.

The present invention is derived from characteristics of Korean that agglutinative-based nouns basically contain a main meaning of a sentence, and may automatically match a tag to a word or a combination of words by separating the original text into minimal morphemes, sequentially combining the morphemes into words, compound words, phrases, compound phrases, clauses, compound clauses, sentences, etc., and then determining attributes such as a part of speech, a type, a sentence component, and a subordination or not.

Figure 3:
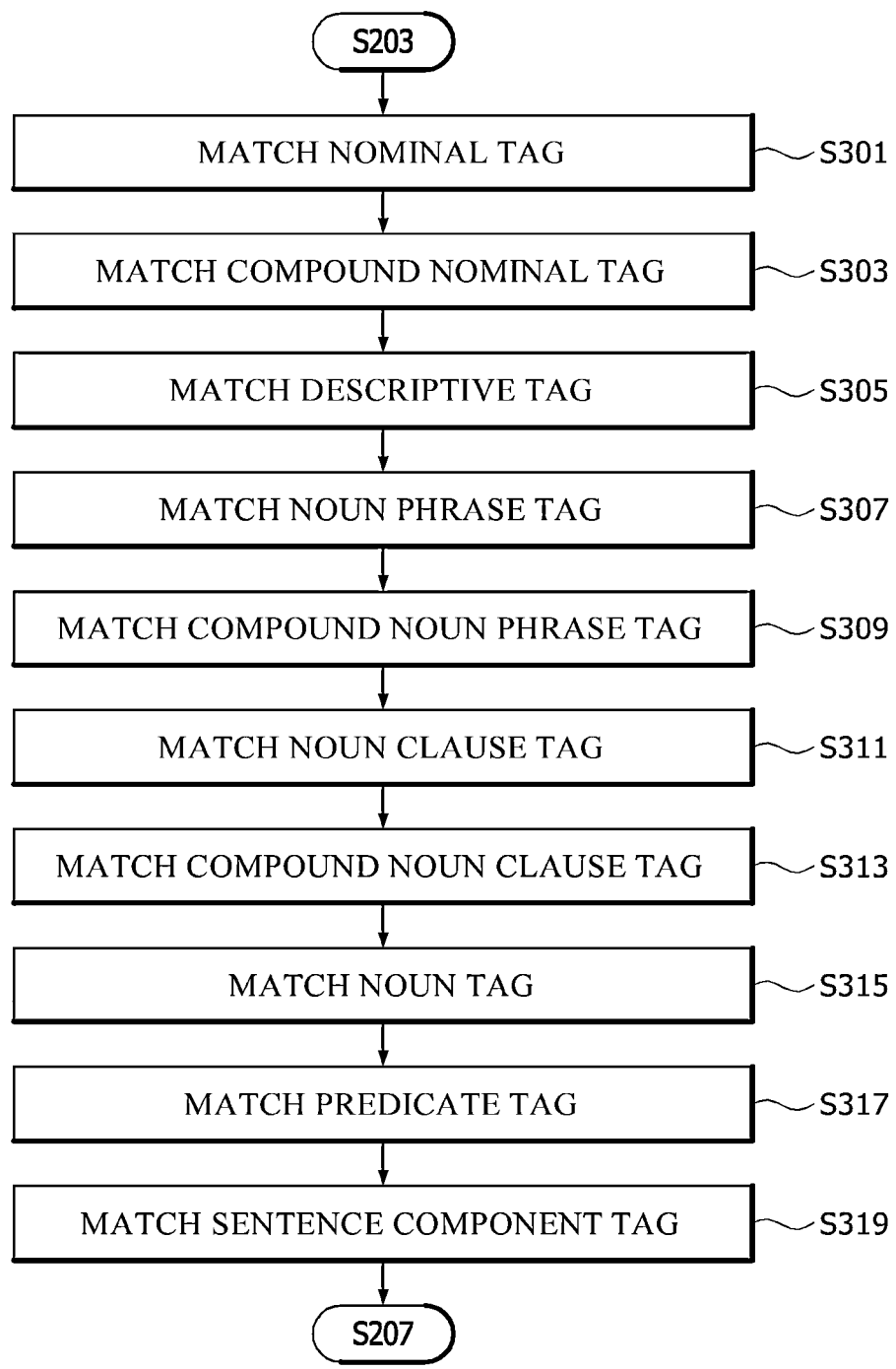
FIG. 3 is a flowchart illustrating an operation of matching a tag to a combination of step-by-step morphemes.

FIG. 3 is a flowchart for describing an operation of matching a tag to a combination of step-by-step morphemes.

Hereinafter, an operation of matching a tag to a combination of step-by-step morphemes will be described with reference to FIG. 3.

The processor 400 may identify, from the original text, a noun type word defined by a first morpheme whose part of speech is a first type or a combination of the first morpheme and another morpheme, and match a noun type tag to the identified noun type word according to a type of noun type word (S301). Here, the noun type tag may be a feature value indicating a type of noun type word.

Subsequently, the processor 400 may identify, from the original text, a compound noun type word defined by a combination of a noun type word and a first type noun type word, and match a compound noun type tag to the identified compound noun type word (S303). Here, the compound noun type tag may be a feature value indicating that the corresponding word is the compound noun type word.

Subsequently, the processor 400 may identify, from the original text, a descriptive word defined by a second morpheme whose part of speech is a second type or a combination of the second morpheme and another morpheme, and match a descriptive tag to the identified descriptive word according to a type of descriptive word (S305). Here, the descriptive tag may be a feature value indicating the type of descriptive word.

Subsequently, the processor 400 may identify, from the original text, a noun phrase defined by a combination of a descriptive word and a third morpheme whose part of speech is a third type, and match a noun phrase tag to the identified noun phrase according to a type of noun phrase (S307). Here, the noun phrase tag may be a feature value indicating the type of noun phrase.

Subsequently, the processor 400 may identify, from the original text, a compound noun phrase defined by a combination of a noun phrase and a noun phrase, and match a compound noun phrase tag to the identified compound noun phrase according to a type of compound noun phrase (S309). Here, the compound noun phrase tag may be a feature value indicating the type of compound noun phrase.

Subsequently, the processor 400 may identify, from the original text, a subordinate component of a noun phrase defined by a combination of a compound noun phrase, a noun phrase, a compound noun type word, or a noun type word and a fourth morpheme whose part of speech is a fourth type and a noun clause defined by a combination of noun phrases, and match a noun clause tag to the identified noun clause according to a type of noun clause (S311). Here, the noun phrase tag may be a feature value indicating the type of noun phrase.

Subsequently, the processor 400 may identify, from the original text, a compound noun clause defined by a combination of a noun clause and a noun clause or a combination of a noun phrase and a noun clause, and match a compound noun clause tag to the identified compound noun clause according to a type of compound noun clause (S313). Here, the compound noun clause tag may be a feature value indicating the type of compound noun clause.

Subsequently, the processor 400 may identify, as a noun, a compound noun clause, a noun clause, a compound noun phrase, a noun phrase, a compound noun type word, and a noun type word included in the original text according to a preset rule, and match a noun tag to the identified noun (S315). Here, the noun tag may be a feature value indicating that the combination of morphemes is a noun.

Subsequently, the processor 400 may identify, from the original text, a predicate defined by a combination of a descriptive word and a fifth morpheme whose part of speech is a fifth type, and match a predicate tag to the identified predicate according to a type of predicate (S317). Here, the predicate tag may be a feature value indicating the type of predicate.

Subsequently, the processor 400 may identify a first word combination defined by a combination of a noun and a sixth morpheme whose part of speech is a sixth type, and match a sentence component tag to the identified first word combination identified according to a sentence component (S319). Here, the sentence component tag may be a feature value indicating the sentence component of the corresponding word combination in a sentence including the corresponding word combination.

Figure 4:
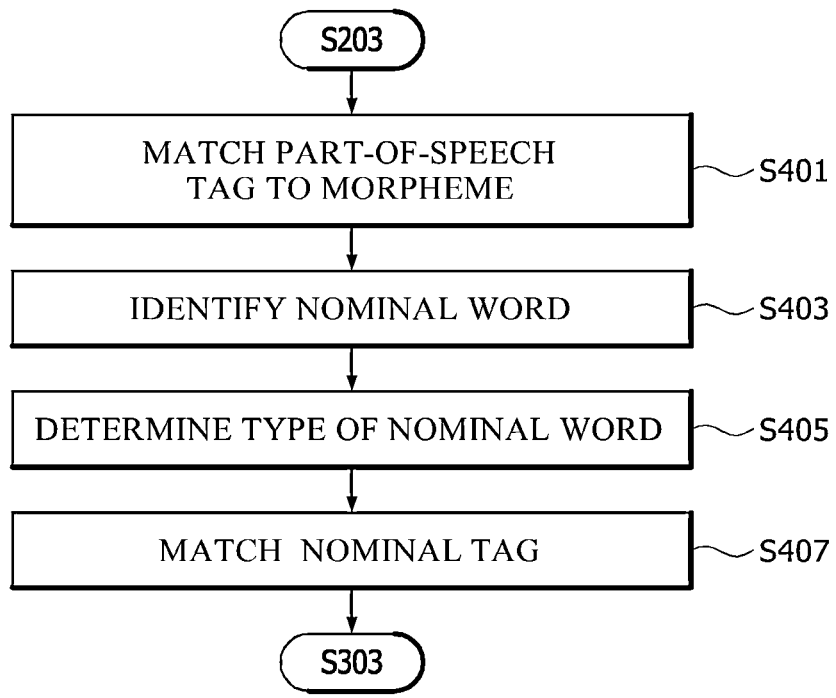
FIG. 4 is a flowchart for describing an operation of matching a noun type tag.

FIG. 4 is a flowchart for describing an operation of matching a noun type tag.

Hereinafter, an operation of matching the noun type tag will be described with reference to FIG. 4.

First, the processor 400 may match a part-of-speech tag to a morpheme according to the part of speech (S401). The processor 400 may determine the part of speech of the morpheme by using the morpheme analysis engine (e.g., MeCab). A lookup table (Table 1) in which part-of-speech tags are stored according to the part of speech of a morpheme is stored in the memory 300, and the processor 400 may refer to the lookup table to detect the part of speech of the corresponding morpheme and match the detected part-of-speech tag to the corresponding morpheme.

TABLE 1

| Part-of-speech name | Tag | Part-of-speech name | Tag |
|---|---|---|---|
| Common noun | NNG | Auxiliary particle | JX |
| Proper noun | NNP | Conjunctive particle | JC |
| Dependent noun | NNB | Pre-final ending | EP |
| Unit noun | NNBC | Terminal ending | EF |
| Numeral | NR | Connective ending | EC |
| Pronoun | NP | Nominal transformative ending | ETN |
| Verb | VV | Adnominal transformative ending | ETM |
| Adjective | VA | Substantive prefix | XPN |
| Auxiliary predicate | VX | Noun derivation suffix | XSN |
| Positive copula | VCP | Verb derivation suffix | XSV |
| Negative copula | VCN | Adjective derivation suffix | XSA |
| Prenoun | MM | Root | XR |
| Common adverb | MAG | Period, question mark, exclamation mark | SF |
| Conjunctive adverb | MAJ | Ellipsis | SE |
| Interjection | IC | Open parenthesis | SSO |
| Subject case particle | JKS | Close parenthesis | SSC |
| Complement case particle | JKC | Delimiter | SC |

TABLE 1-continued

| Part-of-speech name | Tag | Part-of-speech name | Tag |
|---|---|---|---|
| Adnominal case particle | JKG | Other symbols | SY |
| Object case particle | JKO | Foreign language | SL |
| Adverbial case particle | JKB | Chinese character | SH |
| Vocative case particle | JKV | Number | SN |
| Quotation case particle | JKQ | | |

Subsequently, the processor 400 may identify, from the original text, a noun type word defined by a combination of the first morpheme whose part of speech is a first type and another morpheme based on a part-of-speech tag (S403). The first type may be a part of speech capable of performing a nominal role, such as a common noun, a proper noun, or a dependent noun. A combination of part-of-speech tags corresponding to noun type words may be preset and stored in the memory 300. The processor 400 may detect a combination of morphemes corresponding to a combination of part-of-speech tags set from a start point of a sentence, and identify the detected combination of morphemes as a noun type word. Meanwhile, some of the first types (e.g., common noun, proper noun, dependent noun, etc.) may constitute a noun type word alone, and the processor 400 may identify the morpheme itself matched to the part-of-speech tag of the corresponding type as a noun type word.

Subsequently, the processor 400 may determine a type of noun type word based on the combination of part-of-speech tags matched to the noun type word (S405). A lookup table in which combinations of part-of-speech tags are stored according to the type of noun type word is pre-stored in the memory 300, and the processor 400 may refer to the lookup table to detect the type of noun type word corresponding to the combination of part-of-speech tags matched to the corresponding noun type word and determine the detected type as the type of noun type word. The processor 400 may determine a type of noun type word as one of a common noun, a dependent noun, a unit noun, a derived noun, and a possessive noun according to the combination of part-of-speech tags.

Subsequently, the processor 400 may match a noun type tag to a noun type word according to the type of noun type word (S407). The processor 400 may refer to the lookup table in which the noun type tags are stored according to the type of noun type word to detect the noun type tag corresponding to the type of noun type word and match the detected noun type tag to the corresponding noun type word.

Figure 5:
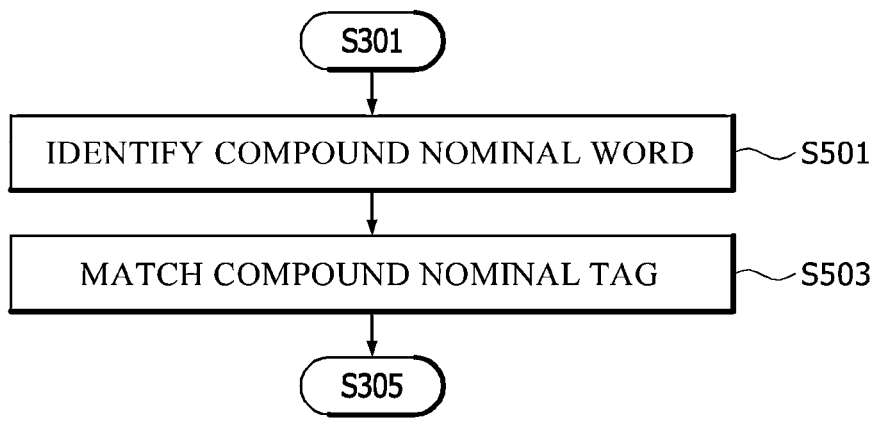
FIG. 5 is a flowchart for describing an operation of matching a compound noun type tag.

FIG. 5 is a flowchart for describing an operation of matching a compound noun type tag.

Hereinafter, the operation of matching the compound noun type tag will be described with reference to FIG. 5.

First, the processor 400 may identify, from the original text, a compound noun type word defined by a combination of a noun type word and a first type noun type word based on the noun type tag (S501). Here, the first type of noun type word may be a noun type word whose type is a common noun or a dependent noun.

That is, the processor 400 may identify, as a compound noun type word, a combination of an arbitrary noun type word and a noun type word whose type is a common noun or a combination of an arbitrary noun type word and a noun type word whose type is a dependent noun. The processor 400 may detect a combination of noun type words corresponding to a combination of arbitrary noun type tags from a starting point of the original text and a noun type tag corresponding to a common noun or a dependent noun, and identify the detected combination of noun type words as a compound noun type word.

Meanwhile, even when a noun type word or a compound noun type word and a noun type word or a compound noun type word are connected through a seventh morpheme whose part of speech is a seventh type, the processor 400 may identify, as a compound noun type word, the noun type word or the compound noun type word and a combination of the seventh morpheme and the noun type word or the compound noun type word. The seventh type may be a conjunctive particle.

Subsequently, the processor 400 may match the compound noun type tag to the compound noun type word (S503). Here, the compound noun type tag may be a feature value indicating that the corresponding word is the compound noun type word.

Figure 6:
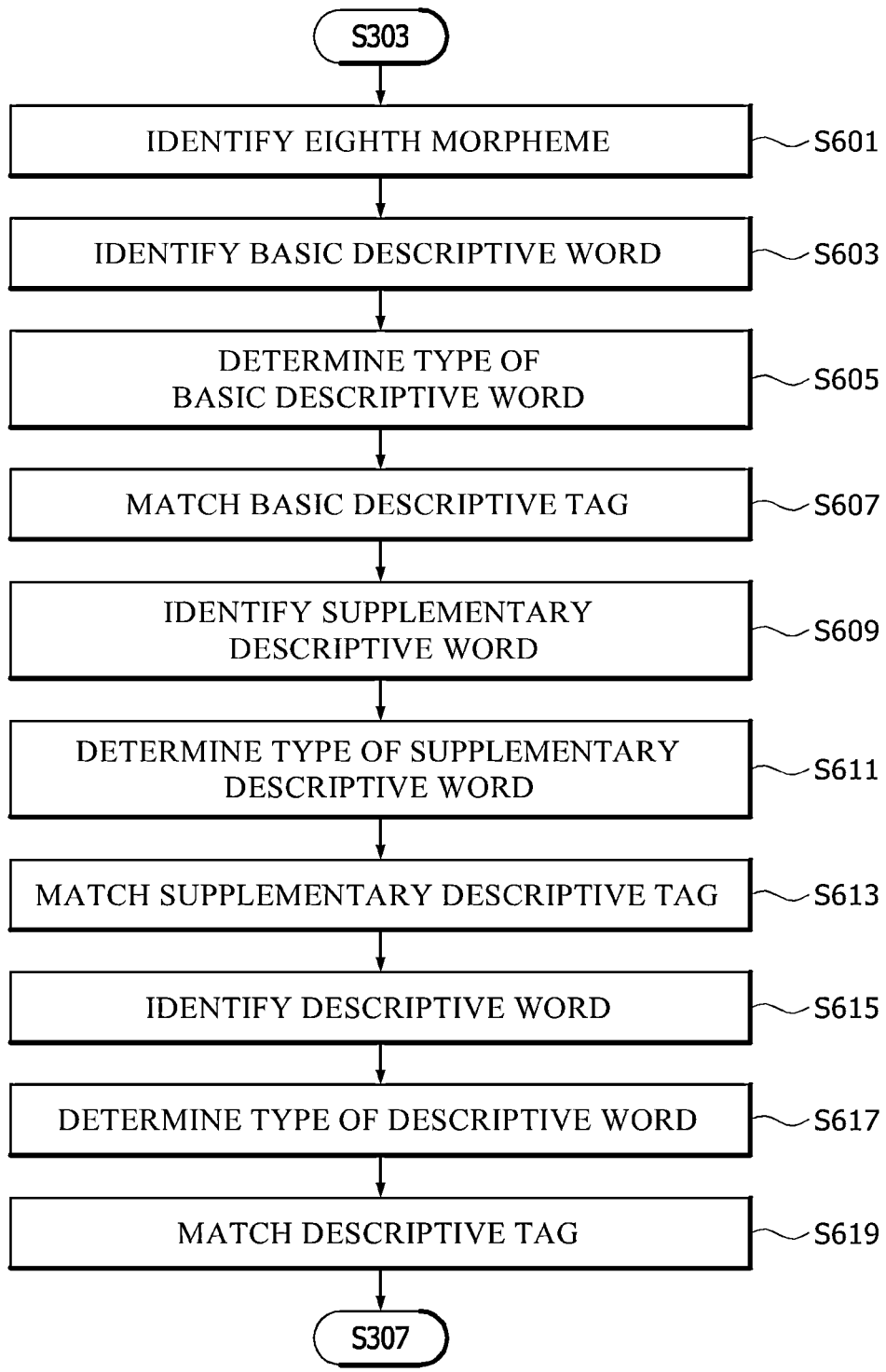
FIG. 6 is a flowchart for describing an operation of matching a descriptive tag.

FIG. 6 is a flowchart for describing an operation of matching a descriptive tag.

Hereinafter, the operation of matching the descriptive tag will be described with reference to FIG. 6.

First, the processor 400 may identify an eighth morpheme whose part of speech is an eighth type from the original text based on the part-of-speech tag (S601). Here, the eighth type may be a nominal transformative ending, an adnominal transformative ending, a terminal ending, or a connective ending. That is, the processor 400 may identify a nominal transformative ending, an adnominal transformative ending, a terminal ending, and a connective ending from the original text.

Then, the processor 400 may identify a basic descriptive word defined by the second morpheme whose part of speech is the second type in front of the eighth morpheme or a combination of the second morpheme and another morpheme based on the part-of-speech tag (S603). The second type may be a verb, a verb-derived suffix, an adjective, an adjective-derived suffix, a positive copula, or a negative copula. A part-of-speech tag corresponding to a descriptive word or a combination of part-of-speech tags may be preset and stored in the memory 300. That is, the processor 400 may detect a morpheme corresponding to a part-of-speech tag or a combination of part-of-speech tags set in front of the eighth morpheme or a combination of morphemes, and identify the detected morpheme or combination of morphemes as a basic descriptive word.

Subsequently, the processor 400 may determine a type of basic descriptive word based on the part-of-speech tag matched to the second morpheme included in the basic descriptive word (S605). That is, the processor 400 may determine a type of basic descriptive word according to a part of speech of a predicate component defined by the second morpheme included in the basic descriptive word. The predicate component may be a morpheme that performs a descriptive role in a descriptive word. The processor 400 may determine a type of descriptive word as one of a verb type, a verb-derived suffix type, an adjective type, an adjective-derived suffix type, a positive copula type, and a negative copula type according to the part of speech of the predicate component.

Subsequently, the processor 400 may match the basic descriptive tag to the basic descriptive word according to the type (S607). A lookup table in which basic descriptive tags are stored according to the type of basic descriptive word is pre-stored in the memory 300, and the processor 400 may refer to the lookup table to detect the basic descriptive tag corresponding to the type of basic descriptive word and match the detected basic descriptive tag to the corresponding basic descriptive word.

Subsequently, the processor 400 may identify a supplementary descriptive word defined by a basic descriptive word located in front of the basic descriptive word (S609). That is, when the basic descriptive words appear consecutively in a sentence, the processor 400 may identify the first basic descriptive word as a supplementary descriptive word describing the following basic descriptive word.

Subsequently, the processor 400 may determine a type of supplementary descriptive word (S611), and match the supplementary descriptive tag to the supplementary descriptive word according to the type (S613). The processor 400 may match the supplementary descriptive tag by the same method as the method of matching a basic descriptive tag.

Subsequently, the processor 400 may identify a descriptive word defined by a combination of a basic descriptive word and a supplementary descriptive word (S615). That is, the processor 400 may combine the basic descriptive word and the supplementary descriptive word and identify the combined basic descriptive word and supplementary descriptive word as a descriptive word. Meanwhile, when there is no supplementary descriptive word in front of the basic descriptive word, the processor 400 may identify the basic descriptive word itself as the descriptive word.

Subsequently, the processor 400 may determine a type of descriptive word based on the basic descriptive tag (S617). That is, the processor 400 may quote the type of basic descriptive word included in the descriptive word as the type of descriptive word.

Subsequently, the processor 400 may match the descriptive tag to the basic descriptive word according to the type (S619). The processor 400 may refer to the lookup table in which the descriptive tags are stored according to the type of descriptive word to detect the descriptive tag corresponding to the type of descriptive word and match the detected descriptive tag to the corresponding noun type word.

Figure 7:
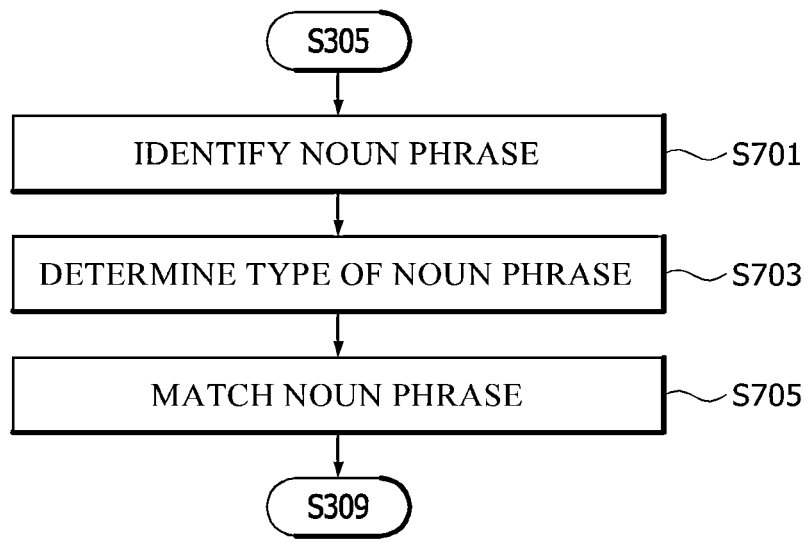
FIG. 7 is a flowchart for describing an operation of matching a noun phrase tag.

FIG. 7 is a flowchart for describing an operation of matching a noun phrase tag.

Hereinafter, the operation of matching the noun phrase tag will be described with reference to FIG. 7.

First, the processor 400 may identify, from the original text, a noun phrase defined by a combination of a descriptive word and a third morpheme whose part of speech is a third type based on the part-of-speech tag and the descriptive tag. The third type may be a nominal transformative ending or an adnominal transformative ending (S701). That is, the processor 400 may identify, as a noun phrase, a combination of a descriptive word and a morpheme whose part of speech is a nominal transformative ending or a combination of the descriptive word and a morpheme whose part of speech is an adnominal transformative ending.

Subsequently, the processor 400 may determine a type of noun phrase based on the descriptive tag and the part-of-speech tag (S703). The processor 400 may determine a type of noun phrase based on the descriptive tag matched to the descriptive word and the part-of-speech tag matched to the third morpheme. That is, the processor 400 may determine a type of noun phrase based on a type of descriptive word included in a noun phrase and the part of speech of the morpheme combined with the descriptive word.

The processor 400 may determine a type of noun phrase as one of a transformative type and an adnominal type according to the part-of-speech tag matched to the third morpheme. That is, the processor 400 may determine a type of noun phrase as the transformative type when the part-of-speech tag corresponding to the nominal transformative ending is matched to the third morpheme, and may determine the type of noun phrase as the adnominal type when the part-of-speech tag matched to the type of part-of-speech tag corresponding to the adnominal transformative ending is matched to the third morpheme. In addition, the processor 400 may determine a type of noun phrase as one of a verb type, an adjective type, a verb derivative type, an adjective derivative type, a positive copula type, and a negative copula type according to the descriptive tag matched to the descriptive word. For example, when a descriptive tag corresponding to a verb type is matched to a descriptive word, and a part-of-speech tag corresponding to a nominal transformative ending is matched to the third morpheme, the processor 400 may determine a type of noun phrase as a transformative type—verb type.

Subsequently, the processor 400 may match a noun phrase tag to a noun phrase according to the type of noun phrase (S705). A lookup table in which noun phrase tags are stored according to the type of noun phrase is pre-stored in the memory 300, and the processor 400 may refer to the lookup table to detect the noun phrase tag corresponding to the corresponding noun phrase and match the detected noun phrase tag to the corresponding noun phrase.

Figure 8:
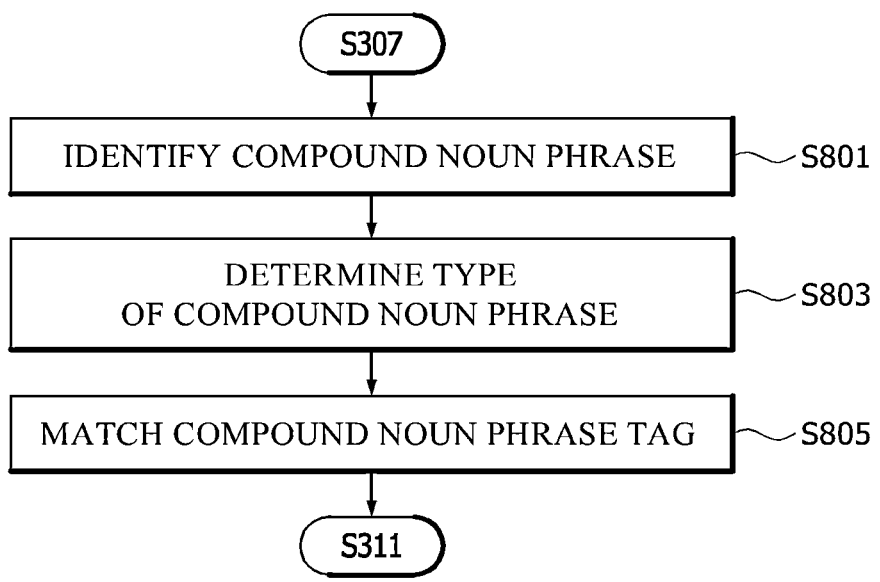
FIG. 8 is a flowchart for describing an operation of matching a compound noun phrase tag.

FIG. 8 is a flowchart for describing an operation of matching a compound noun phrase tag.

Hereinafter, the operation of matching the compound noun phrase tag will be described with reference to FIG. 8.

First, the processor 400 may identify a compound noun phrase defined by a combination of a noun phrase and another noun phrase from the original text based on the noun phrase tag (S801). That is, when the noun phrase is immediately followed by another noun phrase, the processor 400 may combine the corresponding noun phrase and the other noun phrase and identify the combined noun phrase and the other noun phrase as the compound noun phrase.

Meanwhile, even when a noun phrase and another noun phrase are connected through the seventh morpheme (i.e., a morpheme whose part of speech is a conjunctive particle), the processor 400 may identify a combination of the noun phrase, the seventh morpheme, and the other noun phrase as a compound noun phrase.

Subsequently, the processor 400 may determine a type of compound noun phrase based on a noun phrase tag matched to a noun phrase located at the front among the noun phrases included in the compound noun phrase (S803). That is, the type of compound noun phrase follows the type of noun phrase at the front.

Subsequently, the processor 400 may match a compound noun phrase tag to a compound noun phrase according to the type of compound noun phrase (S805). A lookup table in which compound noun phrase tags are stored according to the type of compound noun phrase is pre-stored in the memory 300, and the processor 400 may refer to the lookup table to detect the compound noun phrase tag corresponding to the type of compound noun phrase, and match the detected compound noun phrase tag to the corresponding compound noun phrase.

Figure 9:
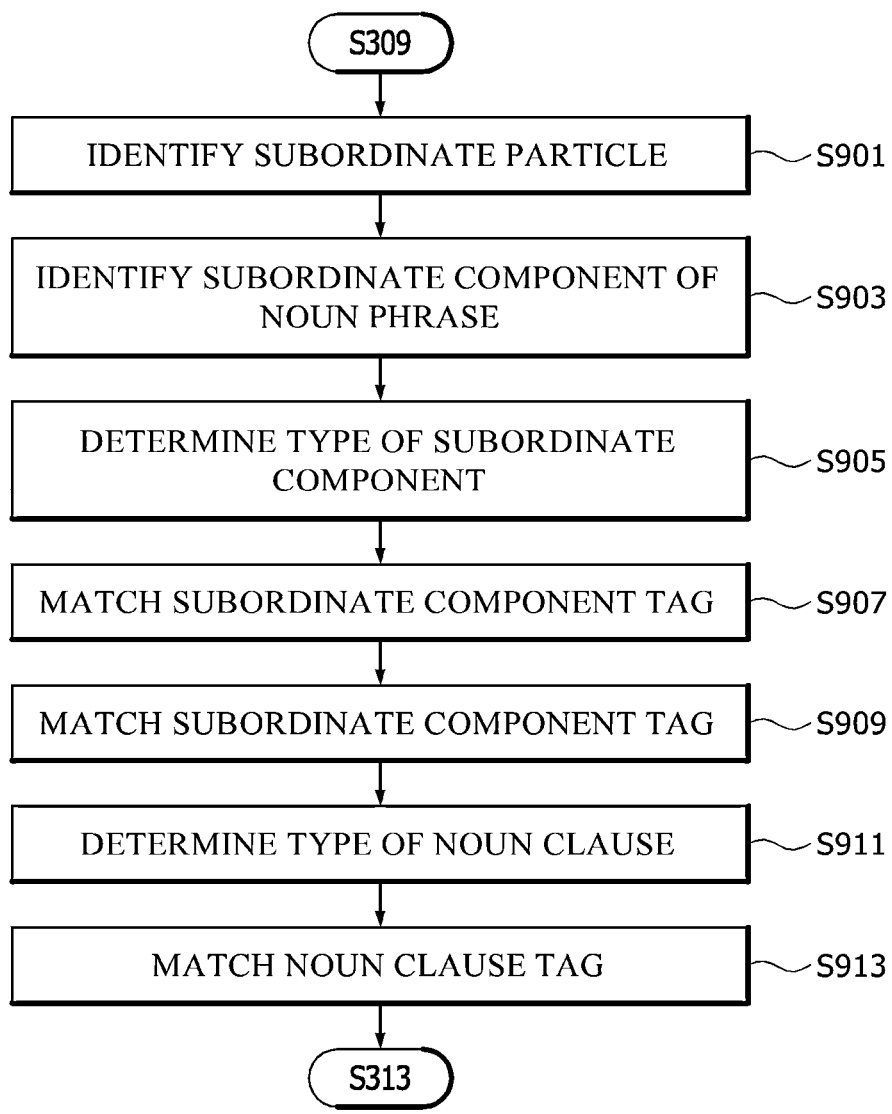
FIG. 9 is a flowchart for describing an operation of matching a noun clause tag.

FIG. 9 is a flowchart for describing an operation of matching a noun clause tag.

Hereinafter, the operation of matching the noun clause tag will be described with reference to FIG. 9.

First, the processor 400 may identify, from the original text, a subordinate particle that is located in front of a noun phrase and defined by a fourth morpheme whose part of speech is a fourth type (S901). The fourth type may be a subject case particle, an object case particle, an adverbial case particle, or a complement case particle. That is, the processor 400 may identify a subject case particle, an object case particle, an adverbial case particle, or a complement case particle located immediately in front of a noun phrase as a subordinate particle.

Subsequently, the processor 400 may identify, from the original text, a subordinate component of a noun phrase (hereinafter referred to as a subordinate component) defined by a combination of a subordinate particle and a compound noun phrase, a noun phrase, a compound noun type word, or a noun type word located in front of the subordinate particle. That is, the processor 400 may combine a subordinate particle located immediately in front of a noun phrase and a compound noun phrase, a noun phrase, a compound noun type word, or a noun type word located before the subordinate particle and identify the combined subordinate particle and the compound noun phrase, the noun phrase, the compound noun type word, or the noun type word as a subordinate component.

Next, the processor 400 may determine a type of subordinate component based on the part-of-speech tag matched to the subordinate particle (S905). That is, the processor 400 may determine a type of subordinate component according to the part of speech of the subordinate particle. The processor 400 may determine a type of subordinate component as one of a subject case particle type, an object case particle type, an adverbial case particle type, or a complement case particle type according to the part of speech of the subordinate particle.

Subsequently, the processor 400 may match the subordinate component tag to the subordinate component according to the type of subordinate component (S907). A lookup table in which subordinate component tags are stored according to the type of subordinate component is pre-stored in the memory 300, and the processor 400 may refer to the lookup table to detect the subordinate component tag corresponding to the type of subordinate component and match the detected subordinate component tag to the subordinate component.

Subsequently, the processor 400 may identify a noun clause defined by a combination of a subordinate component and a noun phrase from the original text based on the subordinate component tag and the noun phrase tag (S909). That is, the processor 400 may combine a noun phrase and a subordinate component located immediately before the noun phrase and identify the noun phrase and the subordinate component as a noun clause. The processor 400 may detect a combination of a subordinate component and a noun phrase corresponding to the combination of the subordinate component tag and the noun phrase tag from the starting point of the sentence, and identify the detected combination of the subordinate component and the noun phrase as a noun clause.

Subsequently, the processor 400 may determine a type of noun clause based on the noun phrase tag matched to the noun phrase included in the noun clause (S911). That is, the processor 400 may determine a type of noun clause based on the type of noun phrase. In other words, the processor 400 may quote a type of noun phrase included in the noun clause as a type of noun clause.

Next, the processor 400 may match a noun clause tag to a noun clause according to the type of noun clause (S913). A lookup table in which noun phrase tags are stored according to the type of noun phrase is pre-stored in the memory 300, and the processor 400 may refer to the lookup table to detect the noun phrase tag corresponding to the corresponding noun phrase and match the detected noun phrase tag to the corresponding noun phrase.

Figure 10:
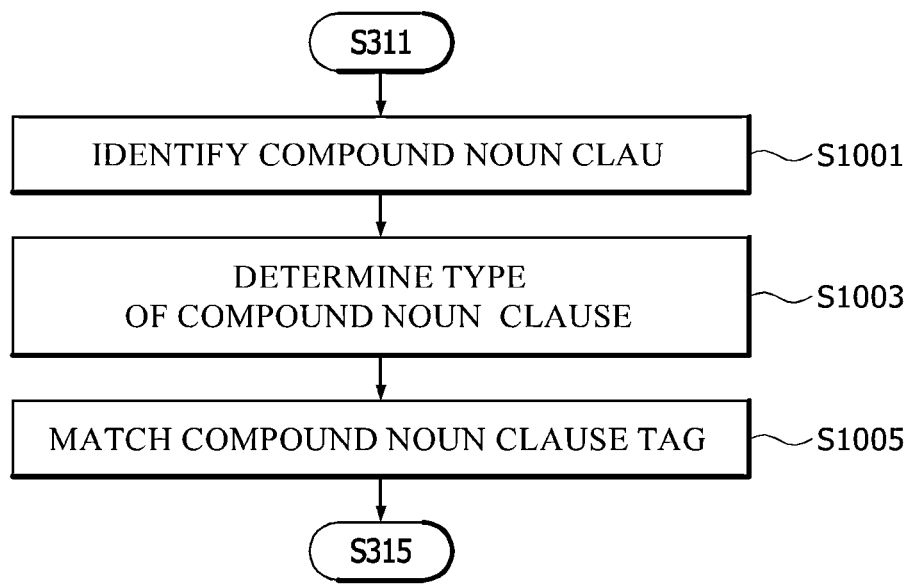
FIG. 10 is a flowchart for describing an operation of matching a compound noun clause tag.

FIG. 10 is a flowchart for describing an operation of matching a compound noun clause tag.

Hereinafter, the operation of matching the compound noun clause tag will be described with reference to FIG. 10.

First, the processor 400 may identify a compound noun clause defined by a combination of a noun phrase and a noun clause or a combination of a noun clause and another noun clause from the original text based on the noun phrase tag and the noun clause tag (S1001). That is, the processor 400 may combine a noun clause and a noun phrase or a noun clause located immediately before the noun phrase and identify the noun clause and the noun phrase or the noun clause as a compound noun clause. In addition, the processor 400 may combine a noun clause and a noun phrase located immediately after the corresponding noun clause and identify the noun clause and the noun phrase as a compound noun clause.

Meanwhile, even when a noun phrase and a noun clause are connected to a noun clause through the seventh morpheme (i.e., a morpheme whose part of speech is a conjunctive particle), the processor 400 may identify a combination of a noun phrase or a noun clause and the seventh morpheme and a noun clause as a compound noun phrase. In addition, even when a noun clause is connected to a noun phrase through the seventh morpheme whose part of speech is connected with the noun phrase through the 7th morpheme, the processor 400 may identify a combination of the noun clause, the seventh morpheme, and the noun phrase as a compound noun clause.

Meanwhile, when a noun phrase is located immediately after a compound noun clause, the processor 400 may combine a combination of a noun phrase or a noun clause to identify the combined noun phrase and noun clause as a compound noun clause. That is, the processor 400 may combine a compound noun clause and a noun phrase located after the compound noun clause and identify the combined compound noun clause and noun phrase as a compound noun clause.

Subsequently, the processor 400 may determine a type of compound noun clause based on a noun phrase included in the compound noun clause or a noun phrase tag or a noun clause tag matched to the noun clause (S1003). That is, the type of compound noun clause follows a type of noun clause or noun phrase included in the compound noun clause. It is determined whether the compound noun clause follows the type of noun clause and noun phrase according to the type of compound noun clause, and information about this may be pre-stored in the memory 300.

Subsequently, the processor 400 may match a compound noun clause tag to a compound noun phrase according to the type of compound noun phrase (S1005). A lookup table in which compound noun clause tags are stored according to the type of subordinate component is pre-stored in the memory 300, and the processor 400 may refer to the lookup table to detect the compound noun clause tag corresponding to the type of compound noun clause and match the detected compound noun clause tag to the corresponding compound noun clause.

Figure 11:
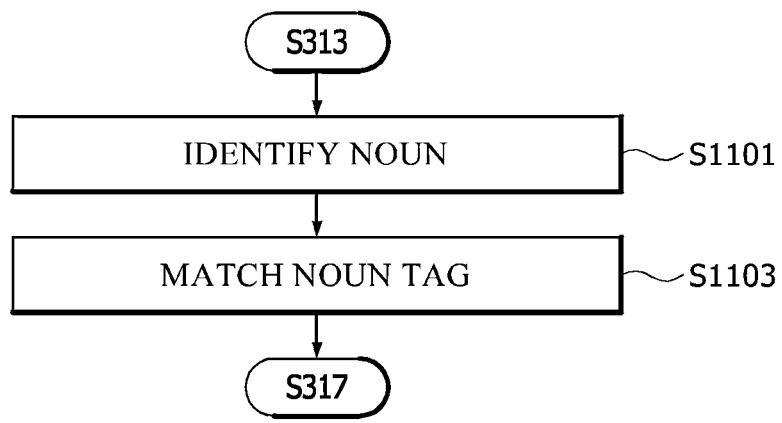
FIG. 11 is a flowchart for describing an operation of matching a noun tag.
Figure 12:
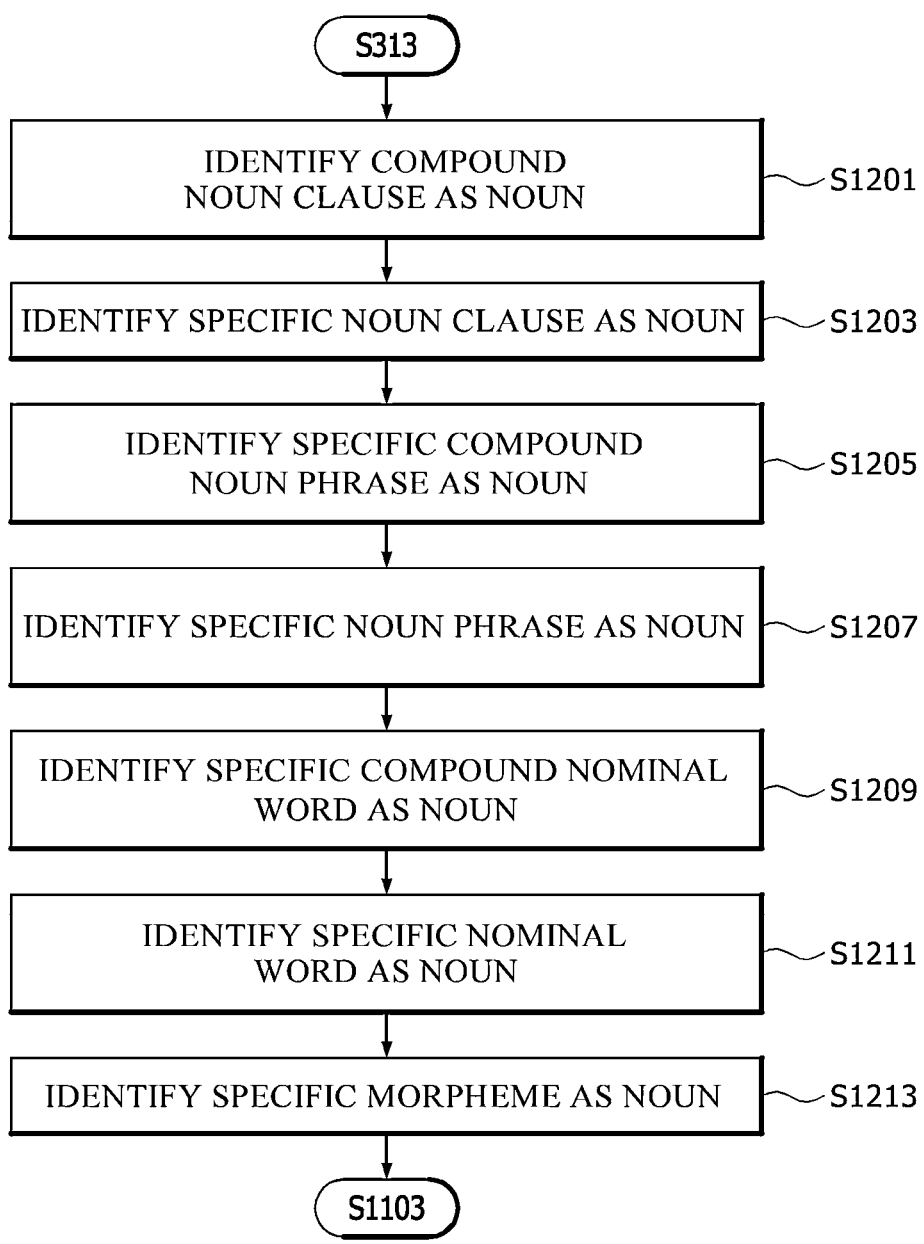
FIG. 12 is a flowchart for describing an operation of identifying a noun.

FIG. 11 is a flowchart for describing an operation of matching a noun tag, and FIG. 12 is a flowchart for describing an operation of identifying a noun.

Hereinafter, the operation of matching the noun tag will be described with reference to FIGS. 11 and 12.

First, referring to FIG. 11, the processor 400 may identify, from the original text, a noun defined by a compound noun clause, a noun clause, a compound noun phrase, a noun phrase, a compound noun type word, a noun type word, or a morpheme that may independently perform a nominal role in a sentence (S1101).

Referring to FIG. 12, the processor 400 may identify a compound noun clause as the noun (S1201), identify a noun clause not included in the compound noun clause as a noun (S1203), identify the compound noun clause and a compound noun phrase not included in the compound noun clause as the noun (S1205), identify the compound noun clause, the noun clause, and a noun phrase not included in the compound noun phrase as the noun (S1207), identify the compound noun clause, the noun clause, the compound noun phrase, and a compound noun type word not included in the noun phrase as the noun (S1209), identify the compound noun clause, the noun clause, the compound noun phrase, and a noun type word not included in the compound noun type word as the noun (S1211), and identify a ninth morpheme whose part of speech is a ninth type among the compound noun clauses, the noun clause, the compound noun phrase, the compound noun type word, and a morpheme not included in the noun type word as the noun (S1213). Here, the ninth type may be a pronoun or a numeral. That is, when a compound noun clause, a noun clause, a compound noun phrase, a compound noun type word, or a noun type word is identified as a noun, the processor 400 does not identify a phrase or a word included in the phrase or word identified as the noun as a noun again.

Referring back to FIG. 11, the processor 400 may match a noun tag to a noun (S1103). Here, the noun tag may be a feature value indicating that the combination of morphemes is a noun. That is, the processor 400 may match a noun tag to a combination of morphemes corresponding to a noun to indicate that a combination of specific morphemes independently performs a nominal role in a sentence.

Figure 13:
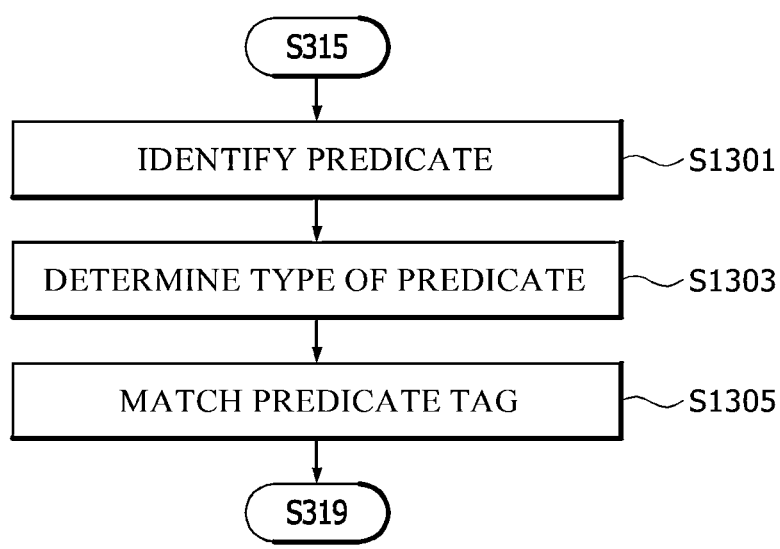
FIG. 13 is a flowchart for describing an operation of matching a predicate tag.

FIG. 13 is a flowchart for describing an operation of matching a predicate tag.

Hereinafter, the operation of matching the predicate tag will be described with reference to FIG. 13.

The processor 400 may identify, from the original text, a predicate defined by a combination of a descriptive tag and the fifth morpheme whose part of speech is the fifth type based on the descriptive tag and the part-of-speech tag (S1301). The fifth type may be a terminal ending or a connective ending. That is, the processor 400 may identify, as a predicate, a combination of a descriptive word and a morpheme whose part of speech is a terminal ending or a combination of the descriptive word and a morpheme whose part of speech is a connective ending.

Subsequently, the processor 400 may determine a type of predicate (S1303). A method of determining a type of predicate will be described below.

Subsequently, the processor 400 may match a predicate tag to a predicate according to the type of predicate (S1305). A lookup table in which predicate tags are stored according to the type of predicate is pre-stored in the memory 300, and the processor 400 may refer to the lookup table to detect the predicate tag corresponding to the corresponding predicate and match the detected predicate tag to the corresponding predicate.

Figure 14:
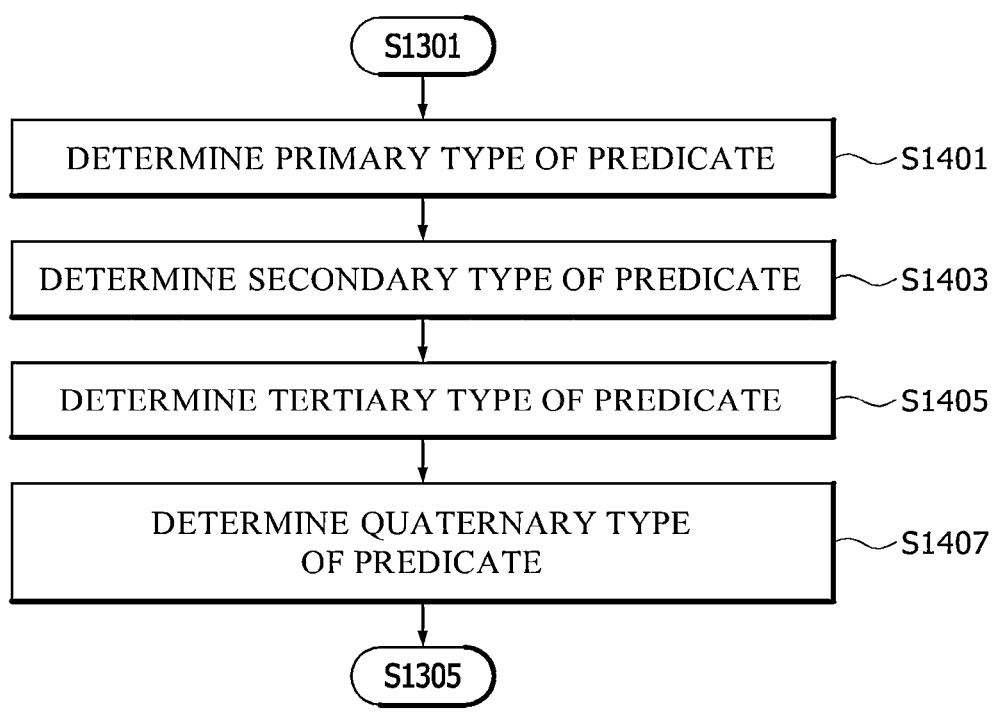
FIG. 14 is a flowchart for describing an operation of determining a type of predicate.

FIG. 14 is a flowchart for describing an operation of determining a type of predicate.

Hereinafter, the operation of determining the type of predicate will be described with reference to FIG. 14.

First, the processor 400 may determine a primary type of predicate based on the descriptive tag matched to the descriptive word included in the predicate (S1401). The processor 400 may determine the type of predicate as one of a verb type, an adjective type, a verb derivative type, an adjective derivative type, a positive copula type, and a negative copula type according to the descriptive tag. That is, the primary type of predicate follows the type of descriptive word.

Subsequently, the processor 400 may determine a secondary type of predicate based on the part-of-speech tag matched to the fifth morpheme (S1403). The processor 400 may determine the secondary type of predicate as one of a terminal type and a connective type according to the part-of-speech tag matched to the fifth morpheme (i.e., a morpheme combined with the descriptive word included in the predicate). When the part-of-speech tag corresponding to the terminal ending is matched to the fifth morpheme, the processor 400 may determine that the secondary type of predicate is the terminal type, and when the part-of-speech tag corresponding to the connection ending is matched to the fifth morpheme, the processor 400 may determine that the secondary type of predicate is the connective type.

When the secondary type of predicate is the terminal type, the processor 400 may determine a tertiary type of predicate based on the morpheme located immediately after the predicate (S1405). The processor 400 may determine the tertiary type of predicate based on whether there is a morpheme matched to a part-of-speech tag corresponding to a sentence-final mark immediately after the predicate and a type of the sentence-final mark (S1407). The processor 400 may determine the tertiary type as one of a period type, an interrogative type, and a subordinate type. The processor 400 may determine, as the subordinate type, the tertiary type of predicate based on when there is no morpheme matched to the part-of-speech tag corresponding to the sentence-final mark immediately after the predicate. When there is a sentence-final after the predicate and the type of sentence-final mark is a period or an exclamation mark, the processor 400 may determine that the tertiary type of predicate is the period type. When there is a sentence-final mark after the predicate and the type of sentence-final mark is a question mark, the processor 400 may determine that the tertiary type of predicate is the interrogative type.

Subsequently, the processor 400 may determine a quaternary type of predicate according to whether there is a noun immediately before the predicate (S1407). That is, the processor 400 may determine, as an incomplete type, the quaternary type of predicate when there is no noun immediately before the predicate (S1407). On the other hand, the processor 400 may determine, as a complete type, the quaternary type of predicate when there is a noun immediately before the predicate (S1407). The processor 400 may determine a sentence that becomes a dependent clause by the corresponding predicate itself as a complete type, and may determine a predicate that becomes a dependent clause by combining with a combination of other words as an incomplete type.

For example, when a descriptive word included in a predicate is a verb type, a part of speech of a morpheme (i.e., the fifth morpheme) combined with the descriptive word is a terminal ending, a part of speech immediately after the predicate is a sentence-final mark, there is a morpheme whose type is a question mark, and there is a noun immediately before the predicate, the processor 400 may determine a type of predicate as the verb type—terminal type—interrogative type— complete type.

Figure 15:
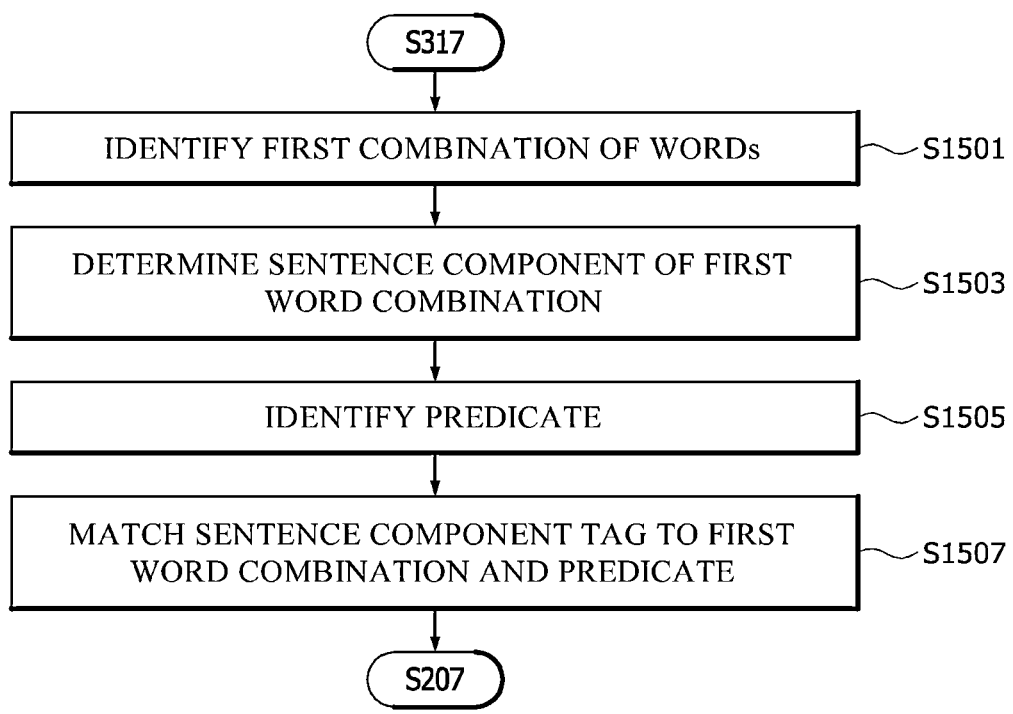
FIG. 15 is a flowchart for describing an operation of matching a sentence component tag.

FIG. 15 is a flowchart for describing an operation of matching a sentence component tag.

Hereinafter, the operation of matching the sentence component tag will be described with reference to FIG. 15.

First, the processor 400 may identify a first word combination defined by a combination of a noun tag and the sixth morpheme whose part of speech is the sixth type from the original text based on the noun tag and the part-of-speech tag (S1501). The sixth type may be a subject case particle, an auxiliary particle, an object case particle, an adverbial case particle, or a complement case particle. That is, the processor 400 may combine a noun, a subject case particle, an auxiliary particle, an object case particle, an adverbial case particle, or a complement case and identify the combined subject case particle, auxiliary particle, object case particle, adverbial case particle, or complement case as the first word combination.

Subsequently, the processor 400 may determine a sentence component of the first word combination based on the part-of-speech tag matched to the sixth morpheme (S1503). That is, the processor 400 may determine the sentence component of the first word combination based on a particle or a part of speech of an auxiliary particle included in the first word combination. The processor 400 may determine the sentence component of the first word combination as one of a subject, an object, a complement, an adverb, and an independent word according to the part of speech of the sixth morpheme.

Subsequently, the processor 400 may identify a predicate from the original text based on the predicate tag (S1505). That is, the processor 400 may identify a combination of morphemes matched to the predicate tag as a predicate.

Subsequently, the processor 400 may match a sentence component tag to the first word combination and the predicate according to the sentence component (S1507). A lookup table in which sentence component tags are stored according to the sentence component is pre-stored in the memory 300, and the processor 400 may refer to the lookup table to detect the sentence component tag corresponding to the corresponding first combination and match the detected sentence component tag to the first word combination. In addition, the processor 400 may match the identified predicate to the sentence component tag corresponding to the predicate.

As described above, the present invention may simplify a sentence included in the original text by dividing the sentences included in the original text by sentence component.

Figure 16:
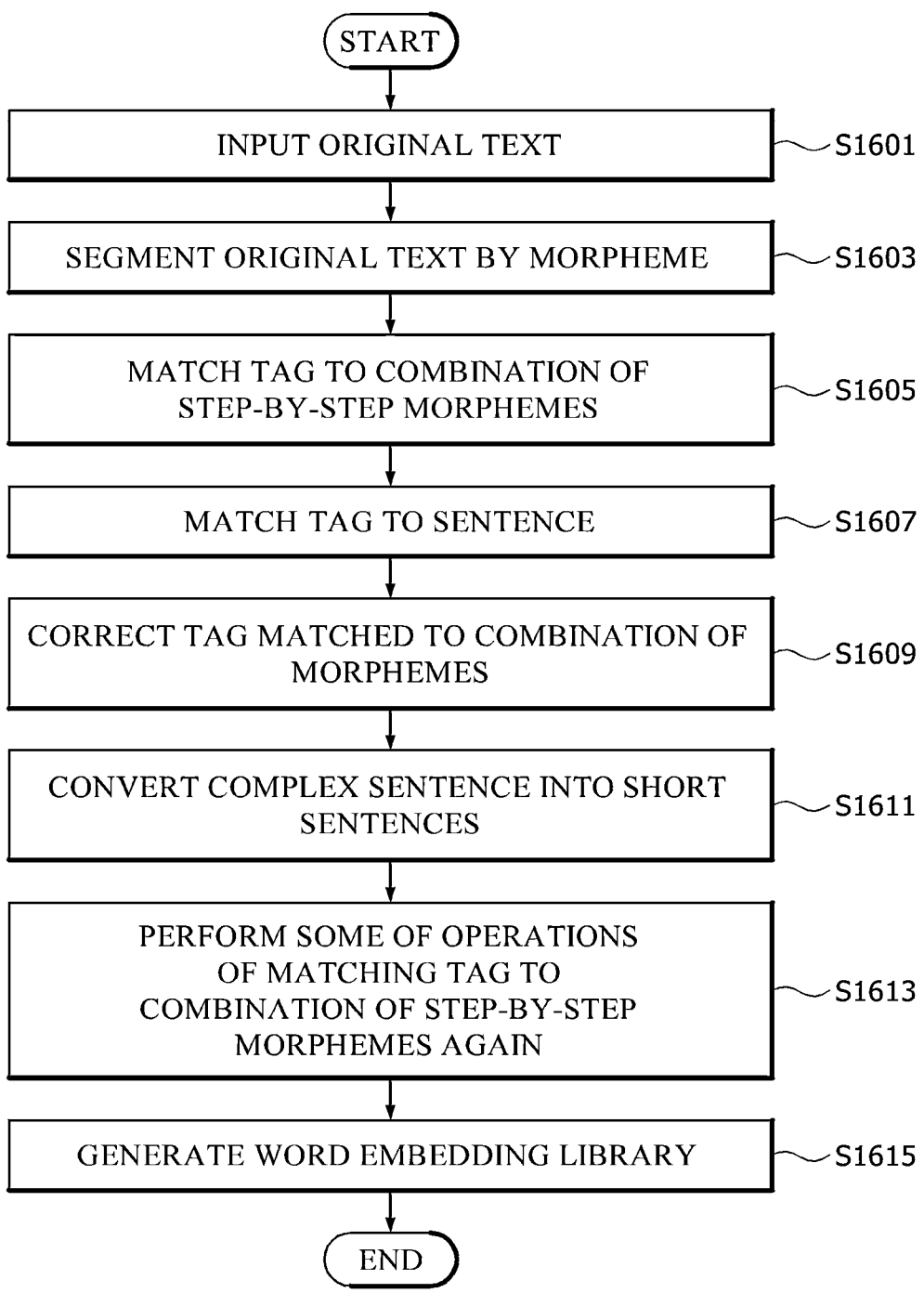
FIG. 16 is a flowchart illustrating a method of generating a word embedding library according to a second embodiment of the present invention.

FIG. 16 is a flowchart for describing a method of generating a word embedding library according to a second embodiment of the present invention.

Hereinafter, the method of generating a word embedding library according to the second embodiment of the present invention will be described with reference to FIG. 16.

First, the processor 400 may receive original text composed of Hangul through the input interface 100 (S1601). Operation S1601 may be the same as operation S201.

Subsequently, the processor 400 may segment the original text by morpheme (S1603), combine the segmented morphemes step by step according to a preset rule, and match a tag to a combination of step-by-step morphemes according to a morphological attribute or a syntactic attribute of the combination of step-by-step morphemes (S1605). Operations S1603 and S1605 may be the same operations as operations S203 and S205.

Subsequently, the processor 400 may match a tag to a sentence included in the original text according to the type of sentence (S1607). The processor 400 may determine whether a sentence is a main sentence or a subordinate sentence according to the absence or presence and a type of a subject included in the sentence and a type of predicate included in the sentence, and match the tag to the sentence according to the determination result. Also, the processor 400 may determine whether a sentence is a short sentence or a complex sentence according to the type of predicate included in the sentence, and match the tag to the sentence according to the determination result.

Subsequently, the processor 400 may correct a tag matched to a morpheme or a combination of morphemes (S1609). The processor 400 may identify a morpheme or a combination of morphemes matched to an incorrect tag among the morphemes or the combinations of morphemes included in the original text, and correct the tag matched to the identified morpheme or combination of morphemes. In addition, the processor 400 may correct a tag matched to the same combination of morphemes as the combination of morphemes registered in an idiom library or a user-defined proper noun library.

Subsequently, the processor 400 may convert a complex sentence included in the original text into a short sentence (S1611). A specific method for the processor 400 to convert a complex sentence into a short sentence will be described below.

Subsequently, the processor 400 may again perform some of the operations of matching a tag to a combination of step-by-step morphemes (S1613). The processor 400 may again perform operations other than the operation (S301) of matching a noun type tag and the operation (S303) of matching a compound noun type tag from the operation (S203) of matching a step-by-step tag.

Subsequently, the processor 400 may classify morphemes included in the original text based on a tag matched to a combination of step-by-step morphemes to generate a word embedding library (S1615).

Figure 17:
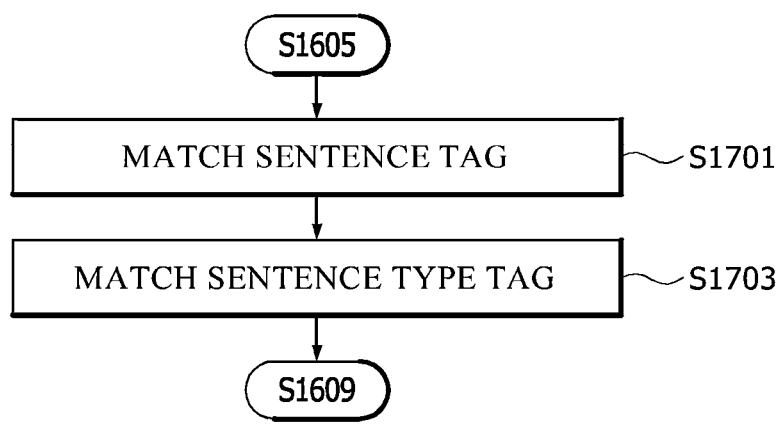
FIG. 17 is a flowchart for describing an operation of matching a tag to a sentence.

FIG. 17 is a flowchart for describing an operation of matching a tag to a sentence.

Hereinafter, the operation of matching the tag to the sentence will be described with reference to FIG. 17.

First, the processor 400 may match a sentence tag to a sentence included in the original text according to whether a sentence is a main sentence or a subordinate sentence (i.e., a sentence limiting the main sentence) (S1701). Here, the sentence tag may be a feature value indicating whether the sentence is the main sentence or the subordinate sentence.

Subsequently, the processor 400 may match a sentence type tag to the sentence included in the original text according to whether the sentence is the short sentence or the complex sentence (S1703). Here, the sentence type tag may be the feature value indicating whether the sentence is the short sentence or the complex sentence.

Meanwhile, the processor 400 may match a subordinate sentence tag to the subordinate sentence included in the original text according to a type of subordinate sentence. Here, the subordinate sentence tag may be a feature value indicating the type of subordinate sentence.

Figure 18:
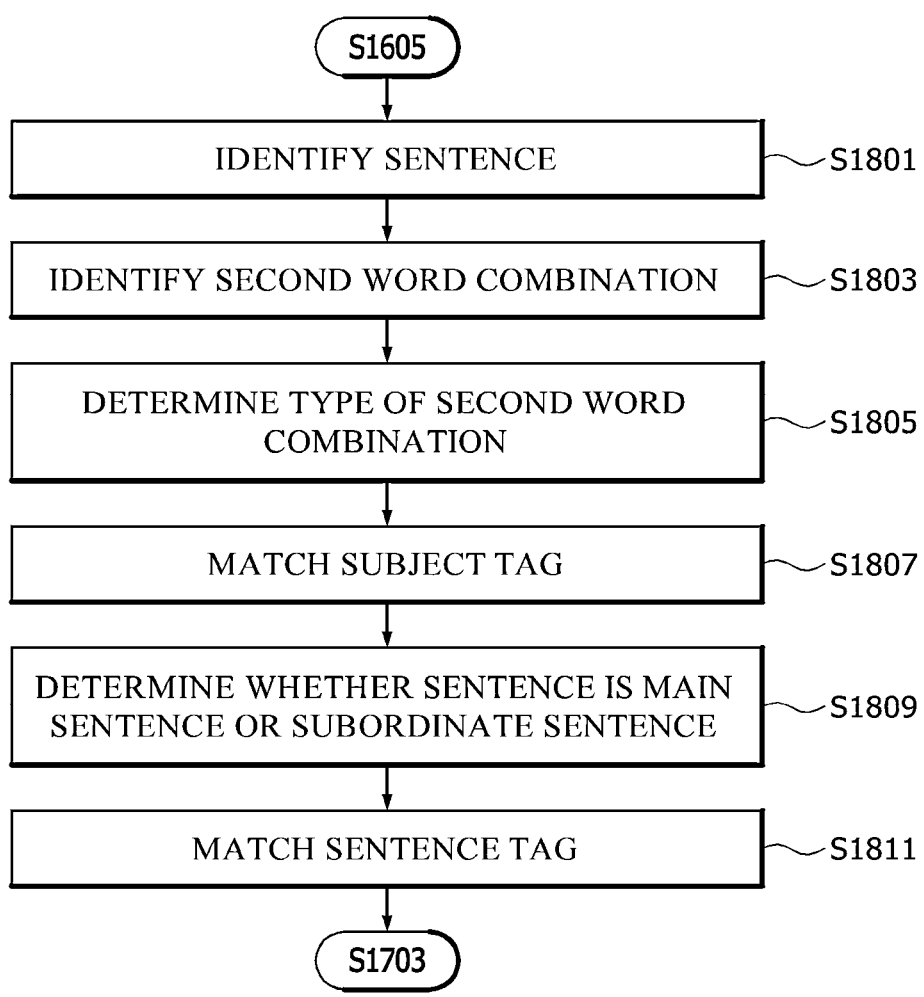
FIG. 18 is a flowchart for describing an operation of matching a sentence tag.

FIG. 18 is a flowchart for describing an operation of matching a sentence tag.

Hereinafter, the operation of matching the sentence tag will be described with reference to FIG. 18.

First, the processor 400 may identify a sentence from the original text (S1801). The processor 400 may classify a sentence based on a morpheme matched to a part-of-speech tag corresponding to a sentence-final mark.

Subsequently, the processor 400 may detect a combination of morphemes in which a sentence component tag corresponding to a subject is matched in the sentence and identify the detected combination of morphemes as a second word combination (S1803). That is, the processor 400 may detect a combination of words whose sentence component is a subject in the sentence, and identify the detected combination of words as the second word combination.

Subsequently, the processor 400 may determine a type of second word combination according to a preset rule (S1805). The processor 400 may determine the type of second word combination as one of a true subject or a false subject. According to an embodiment, the processor 400 may determine the corresponding second word combination as a true subject when only one second word combination is included in the sentence including the second word combination, determine the second word combination appearing first as a true subject when the identified sentence includes two or more second word combinations, and determine all the second word combinations appearing later as false subjects.

Subsequently, the processor 400 may match a sentence tag to the second word combination according to the type (S1807). That is, when the type of second word combination is a true subject, the processor 400 may match a subject tag corresponding to the true subject to the second word combination, and when the type of second word combination is a false subject, the processor 400 may match a subject tag corresponding to the false subject to the corresponding second word combination.

Subsequently, the processor 400 may determine whether a sentence is a main sentence or a subordinate sentence based on a subject tag matched to the subject included in the sentence, a predicate tag matched to the predicate included in the sentence, and whether a subject is present in the sentence (S1809). That is, the processor 400 may determine whether a sentence is a main sentence or a subordinate depending on whether there is a subject in the corresponding sentence, whether the subject included in the corresponding sentence is a true subject or a false subject, and whether a sentence is a main sentence or a subordinate sentence according to the type of predicate included in the corresponding sentence. Meanwhile, in order to determine whether the corresponding sentence is the main sentence or the subordinate sentence, it may be additionally considered whether there is a combination of morphemes matched a sentence component tag corresponding to an object in the corresponding sentence, or the like. A condition for a sentence to be a main sentence and a condition for a sentence to be a subordinate sentence may be preset and stored in the memory 300.

Subsequently, the sentence tag may be matched to the sentence according to the result of determining whether the sentence is the main sentence or the subordinate sentence (S1811). That is, the processor 400 may match the sentence tag corresponding to the main sentence to the corresponding sentence when the corresponding sentence is the main sentence, and match the sentence tag corresponding to the subordinate sentence to the corresponding sentence when the corresponding sentence is the subordinate sentence.

Meanwhile, when it is determined that the sentence is the subordinate sentence, the processor 400 may determine a type of subordinate sentence according to whether a predicate of a preset type (e.g., a predicate of an incomplete type— terminal/interrogative type) is located immediately after the subordinate sentence and a syllable rule (i.e., a type or shape of morpheme) of the fifth morpheme (i.e., a morpheme matched to a part-of-speech tag corresponding to a connective ending), and match the subordinate sentence tag to the subordinate sentence according to the determination result. The processor 400 may determine the type of subordinate sentence as one of a dependent clause, an adverbial clause, a quoted clause, an object clause, and a parallel clause. For example, when the predicate of the incomplete type—terminal type is located immediately after the subordinate sentence and the shape (kind) of the morpheme matched to the part-of-speech tag corresponding to the connective ending is "like," the processor 400 may determine the type of subordinate sentence as an adverbial clause. The conditions for each type of subordinate sentence may be preset and stored in the memory 300.

Figure 19:
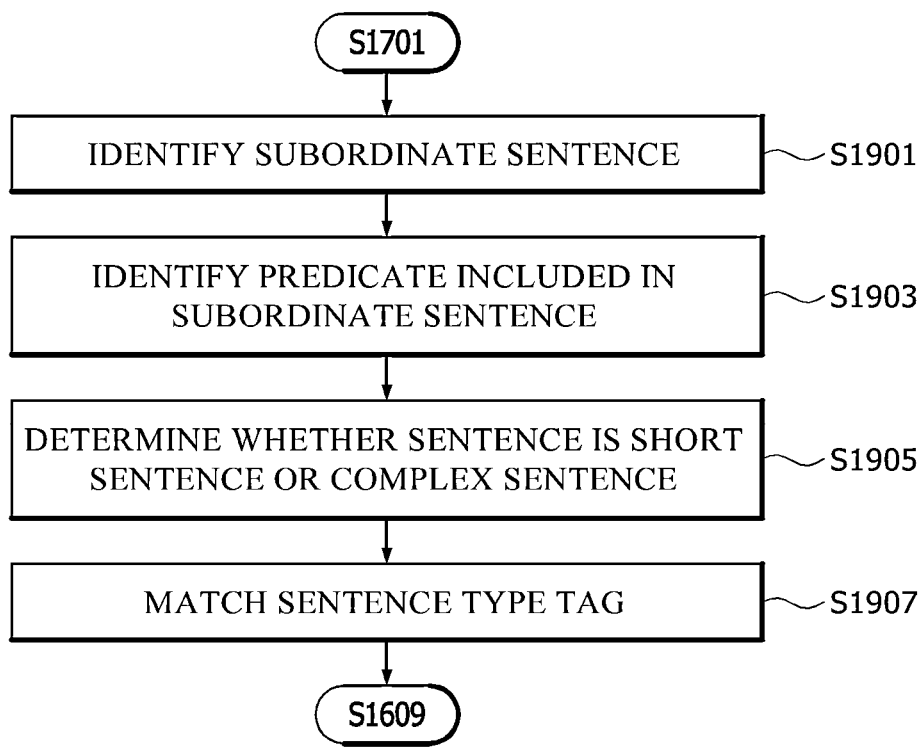
FIG. 19 is a flowchart for describing an operation of matching a sentence type tag.

FIG. 19 is a flowchart for describing an operation of matching a sentence type tag.

Hereinafter, the operation of matching the sentence component tag will be described with reference to FIG. 19.

First, the processor 400 may identify a subordinate sentence from the original text based on the sentence tag (S1901). The processor 400 may identify a sentence in which a sentence tag corresponding to a subordinate sentence is matched from the original text.

Subsequently, the processor 400 may identify the predicate included in the sentence (S1903). The processor 400 may identify a predicate by detecting a combination of words matched to the sentence component tag corresponding to the predicate.

Subsequently, the processor 400 may determine whether a sentence is a short sentence or a complex sentence based on the predicate tag matched to the predicate (S1905). When the predicate is matched to the predicate tag corresponding to a connection type, the processor 400 may determine a sentence as a complex sentence, and when the predicate does not match the predicate tag corresponding to the connection type, the processor 400 may determine the sentence as the short sentence.

Subsequently, the processor 400 may match the sentence type tag to the sentence according to the result of determining whether the sentence is the short sentence or the complex sentence (S1907). When it is determined that the corresponding sentence is the short sentence, the processor 400 may match the sentence type tag corresponding to the short sentence to the corresponding sentence, and when it is determined that the corresponding sentence is the complex sentence, the processor may match the sentence type tag corresponding to the complex sentence to the corresponding sentence.

Figure 20:
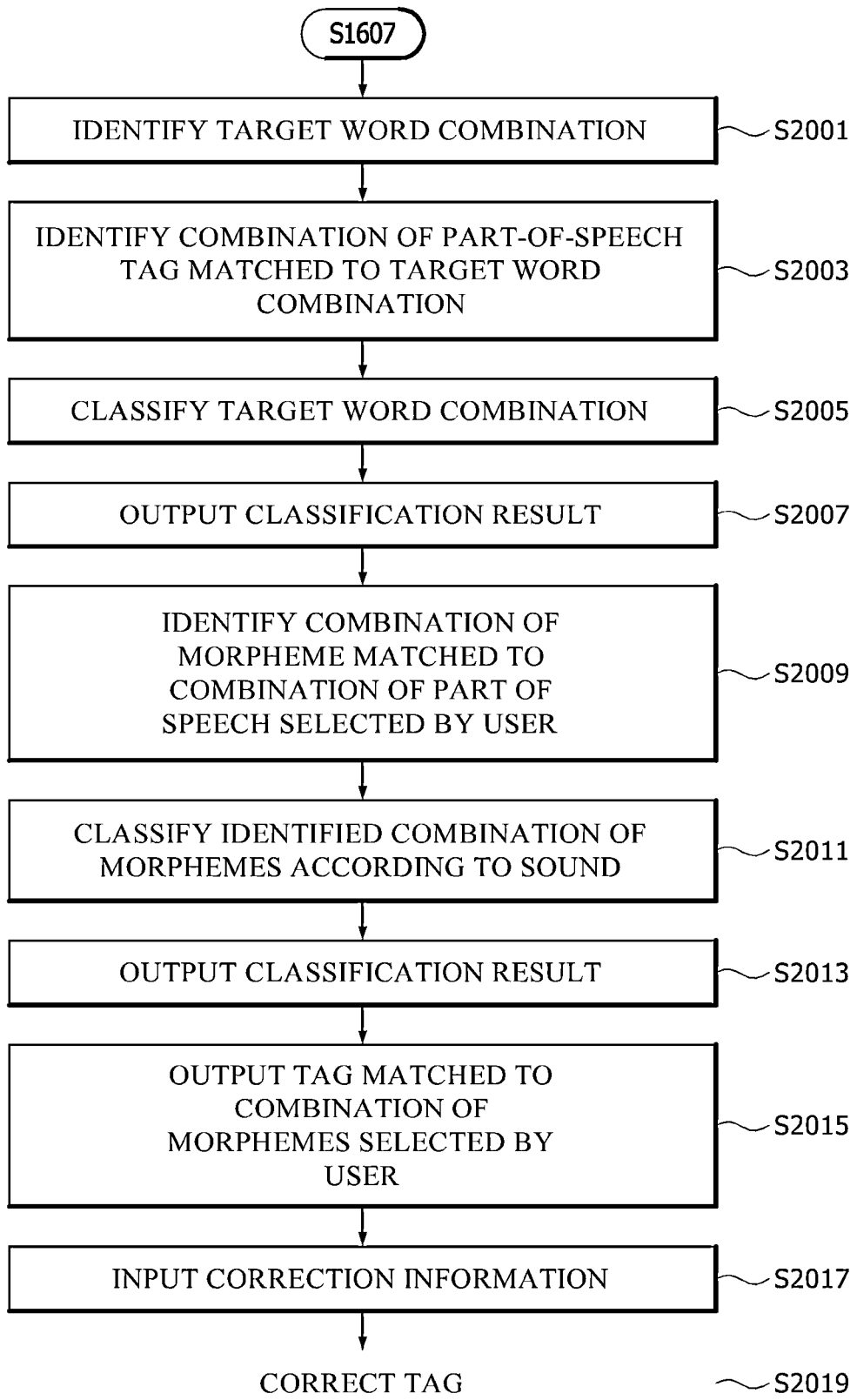
FIG. 20 is a first flowchart for describing an operation of correcting a tag.

FIG. 20 is a first flowchart for describing an operation of correcting a tag.

Hereinafter, the operation of correcting the tag will be described with reference to FIG. 20.

First, the processor 400 may identify a target word combination matched to a target tag input by a user from the original text (S2001). The processor 400 may receive one of the tags from the user, detect a combination of words matched to the received tag from the original text, and identify the combination of words as a target word combination.

Subsequently, the processor 400 may identify a combination (arrangement) of part-of-speech tags matched to the target word combination (S2003).

Subsequently, the processor 400 may classify the target word combinations according to the identity of the part-of-speech tag (S2005). That is, the processor 400 may classify the target word combinations according to the identity of the part-of-speech tag, calculate a frequency thereof, and arrange the target word combinations in descending order according to the frequency. Table 2 shows an example of a case in which a compound noun type word tag is selected by a user.

Subsequently, the processor 400 may output a result of classifying the target word combinations according to the identity of the part-of-speech tag through the display 200 (S2007). That is, the processor 400 may output the classification result as shown in [Table 2].

TABLE 2

| Number | Frequency | Format |
|---|---|---|
| 1 | 7 | NNG_NNG |
| 2 | 5 | NNG_NNB |
| 3 | 4 | NNG_JKG_NNG |
| 4 | 2 | NP_NNG_NNB |
| 5 | 1 | MM_NP_NNG |

Subsequently, the processor 400 may identify a combination of morphemes matched to a combination of part-of-speech tags (e.g., one of the sequence numbers 1 to 5 in Table 2) selected by a user as one of the combinations (arrangements) of the output part-of-speech tags, and classify the identified combination of morphemes according to a sound. The processor 400 may receive one of the output combinations of part-of-speech tags. The processor 400 may classify a combination of words matched to a combination of part-of-speech tags input by a user according to a sound, calculate a frequency, and arrange a combination of words in descending order according to the frequency. Table 3 shows an example of a case in which a combination (sequence number 1 in Table 2) of part-of-speech tags corresponding to NNG-NNG is selected by a user.

TABLE 3

| Sequence number | Frequency | Format | | | |
|---|---|---|---|---|---|
| 1 | 4 | Medicine | | | Doctor |
| | | NNG | SPACE | | NNG |
| 2 | 3 | Solomon | | | Hospital |
| | | NNP | SPACE | | NNG |

Subsequently, the processor 400 may output the result of classifying a combination of morphemes matched to a combination of part-of-speech tags selected by a user according to sound (i.e., shape) through the display 200 (S2013). That is, the processor 400 may output the classification result as shown in [Table 3].

Subsequently, the processor 400 may output the tag matched to the combination of morphemes selected by the user through the display 200 (S2015). That is, the processor 400 may output the tag matched to the combination of words as shown in [Table 4].

Subsequently, the processor 400 may receive correction information for the output tag from the user (S2017), and correct the tag matched to the combination of words based on the received correction information (S2019). The processor 400 may correct the tag matched to the combination of words based on the correction information received from the user as shown in [Table 5]. Table 5 shows an example in which a range of a noun tag is corrected. In this way, the present invention may correct the tag matched to the combination of morphemes.

TABLE 5

| | Last year | — | The United States | — | New York | in | — | Ass | ault | — | Case | So- | called |
|---|---|---|---|---|---|---|---|---|---|---|---|---|---|
| 1 | NNG | SPACE | NNP | SPACE | NNP | JKB | SPACE | VV | EC | SPACE | NNG | VCP | ETM |
| 2 | NNG | SPACE | | noun_gen | | JKB | SPACE | VV | EC | SPACE | noun | bs_desc | ETM |

According to another embodiment, the processor 400 may identify, from the original text, a combination of erroneous words defined as a combination of morphemes having the same sound (i.e., shape) but having different matched tags, output a tag matched to the identified combination of error words, receive the correction information for the combination of error words from a user, and correct the tag matched to the combination of erroneous words based on the received correction information.

Figure 21:
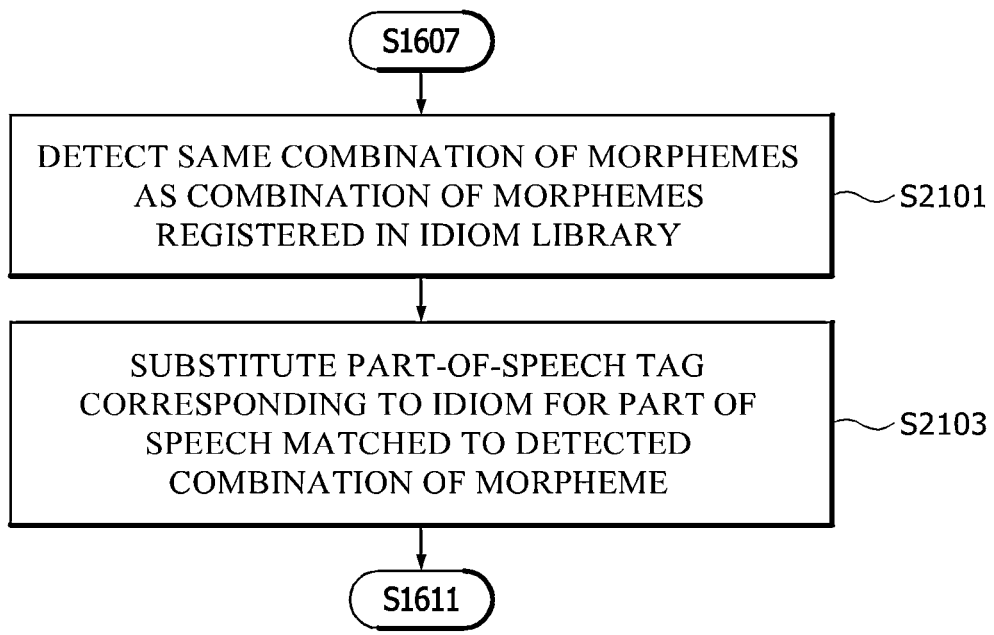
FIG. 21 is a second flowchart for describing an operation of correcting a tag.

FIG. 21 is a second flowchart for describing an operation of correcting a tag.

Hereinafter, the operation of correcting the tag will be described with reference to FIG. 21.

The processor 400 may detect the same combination of morphemes as the combination of morphemes registered in the preset idiom library from the original text (S2101). Here, identity may mean morphological identity (i.e., shape). A combination of an idiomatic expression and a part-of-speech tag corresponding to the idiomatic expression may be registered in the idiom library. The processor 400 may receive a new idiomatic expression from a user and update an idiom library by adding the received idiomatic expression to the idiom library.

Subsequently, the processor 400 may substitute a part-of-speech tag corresponding to an idiom for the combination of part-of-speech tags matched to the detected combination of morphemes (S2103). That is, the processor 400 may regard the combination of morphemes corresponding to the idiomatic expression registered in the idiomatic word library as one morpheme whose part of speech is an idiom.

In this way, the present invention may simplify complex sentences included in the original text by treating the idiomatic expressions included in the original text as one part of speech.

TABLE 4

| | Last year | — | The United States | — | New York | in | — | Ass | ault | — | Case | So- | called |
|---|---|---|---|---|---|---|---|---|---|---|---|---|---|
| 1 | NNG | SPACE | NNP | SPACE | NNP | JKB | SPACE | VV | EC | SPACE | NNG | VCP | ETM |
| 2 | | | noun_gen | | | JKB | SPACE | VV | EC | SPACE | noun | bs_desc | ETM |

Figure 22:
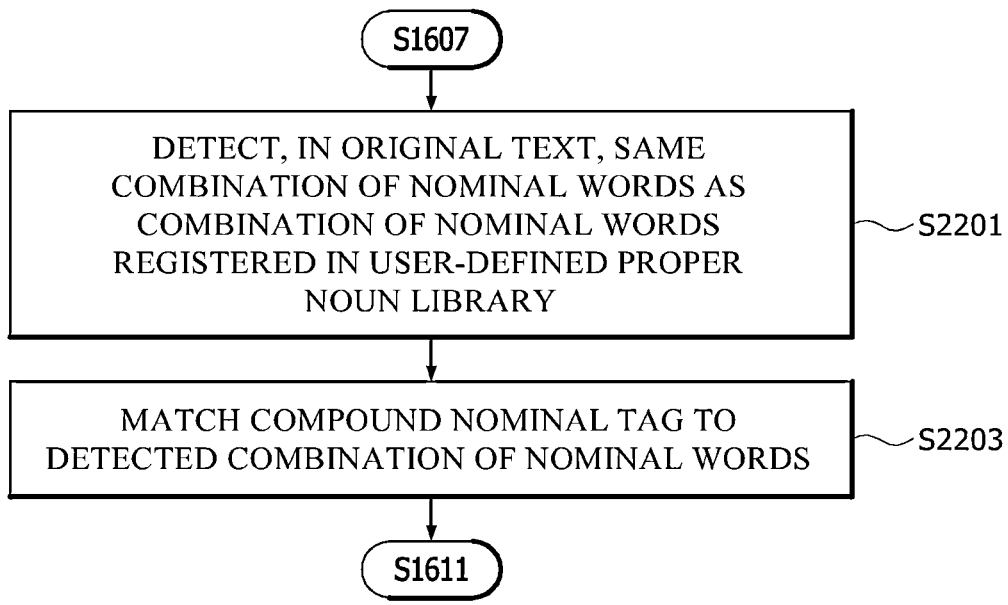
FIG. 22 is a third flowchart for describing an operation of correcting a tag.

FIG. 22 is a third flowchart for describing an operation of correcting a tag.

Hereinafter, the operation of correcting the tag will be described with reference to FIG. 22.

The processor 400 may detect, from the original text, the same combination of noun type words as the combination of noun type words registered in a preset user-defined proper noun library (S2201). Here, identity may mean morphological identity (i.e., shape). A combination of a user-defined proper noun defined by a user and a noun type word corresponding to the user-defined proper noun may be registered in the user-defined proper noun library. The processor 400 may receive a new user-defined proper noun input by the user and update the user-defined proper noun library by adding the received user-defined proper noun to the user-defined proper noun library.

Subsequently, the processor 400 may match the compound noun tag to the detected combination of noun words (S2203). That is, the processor 400 may regard the combination of noun type words corresponding to the user-defined proper nouns registered in the user-defined proper noun library as a compound noun type word.

As such, the present invention may simplify the complex sentence included in the original text by treating the user-defined proper noun itself included in the original text as one compound noun type word.

Figure 23:
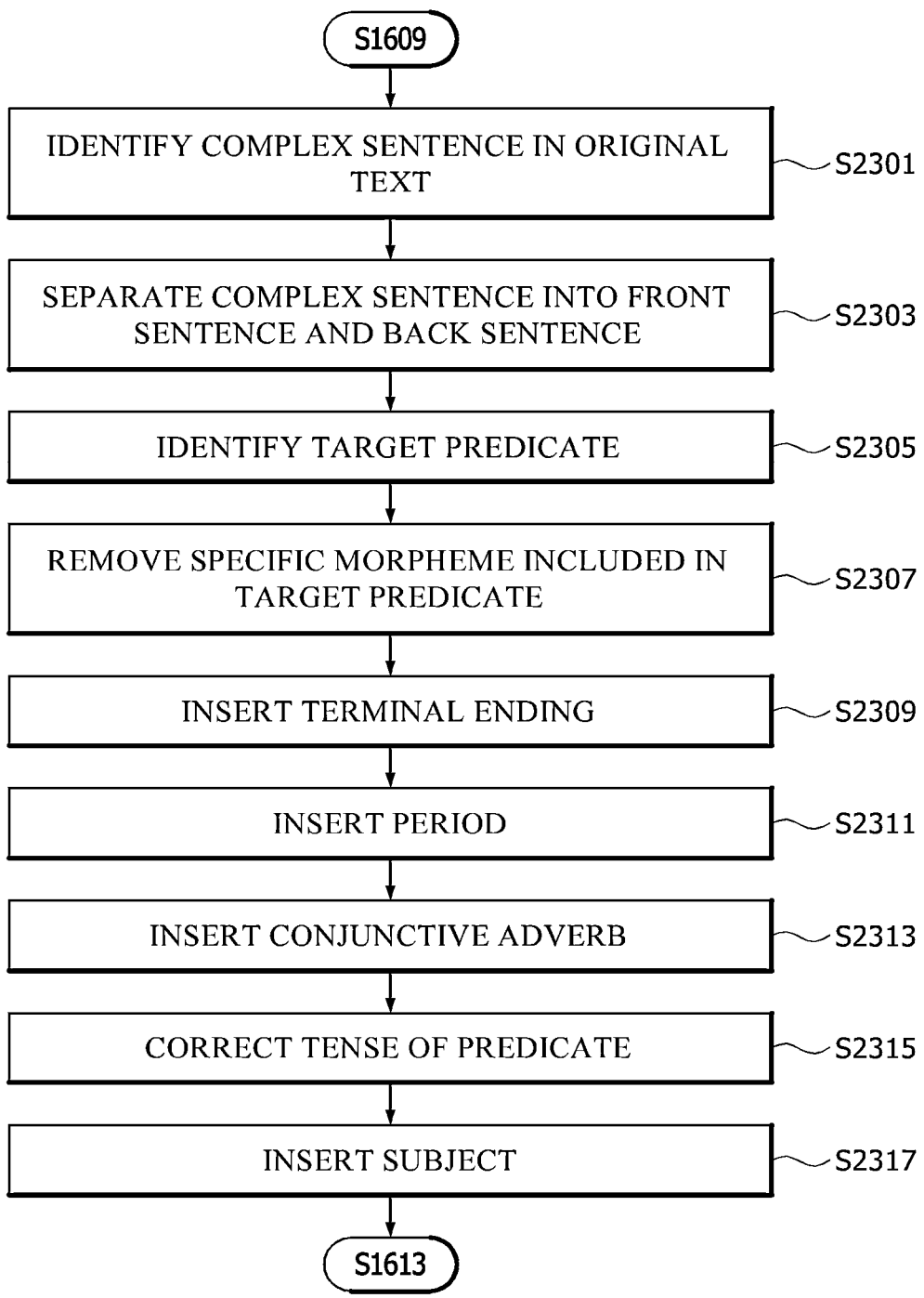
FIG. 23 is a flowchart for describing an operation of converting a complex sentence into a short sentence.

FIG. 23 is a flowchart for describing an operation of converting a complex sentence into a short sentence.

Hereinafter, an operation of converting a complex sentence into a short sentence will be described with reference to FIG. 23.

First, the processor 400 may identify the complex sentence included in the original text (S2301). The processor 400 may detect a sentence of a word matched to a sentence type tag corresponding to a complex sentence and identify the detected sentence as a complex sentence.

Subsequently, the processor 400 may separate the complex sentence into a front sentence and a back sentence (S2303). The complex sentence may be separated into the front sentence and the back sentence based on a predicate matched to a predicate tag corresponding to a connection type among the predicates included in the identified complex sentence. The processor 400 may classify the entire front sentence as a front sentence, including the connection type predicate, and classify the entire back sentence as a back sentence. Even when the complex sentence is composed of three or more sentences, a second sentence and a third sentence may be divided by the same method as the above-described method.

Subsequently, the processor 400 may identify a predicate matched to a predicate tag of a preset type in the front sentence as a target predicate (S2305). Here, the predicate tag of the preset type may be a predicate tag corresponding to a connection type.

Subsequently, the processor 400 may remove a morpheme matched to a part-of-speech tag of a preset type among the morphemes included in the target predicate (S2307). Here, the part-of-speech tag of the preset type may be a part-of-speech tag corresponding to a connective ending. That is, the processor 400 may remove the connection ending included in the target predicate.

Subsequently, the processor 400 may insert a terminal ending at a location where the morpheme is removed (S2309). The processor 400 may insert the terminal ending after a predicate component of the predicate matched to the predicate tag corresponding to the connective type or a pre-final ending located immediately after the predicate component.

Subsequently, the processor 400 may insert a period after the terminal ending (S2311).

Subsequently, the processor 400 may insert a conjunctive adverb after the period (S2313). The processor 400 may determine a type of conjunctive adverb to be inserted after the period based on the type of removed connection ending. The conjunctive adverb according to the type of connective ending may be preset and stored in the memory 300. For example, when the kind of connection ending is "-nde," the processor 400 may insert "by the way" as the conjunctive adverb. The kind of conjunctive adverb according to the type of connective ending may be preset and stored in the memory 300.

Subsequently, the processor 400 may correct a tense of the predicate included in the predicate so that the tenses of the front sentence and the back sentence match (S2315). The processor 400 may correct the tense of the predicate included in the front sentence according to the tense of the predicate matched to the predicate tag corresponding to the terminal type among the predicates included in the back sentence.

Subsequently, the processor 400 may insert a subject into the back sentence (S2317). When a complex sentence is separated into short sentences, the subject of the back sentence is omitted in most cases. Therefore, in order to construct a complete short sentence, a subject must be added to the back sentence. The processor 400 may identify a combination of words matched to a subject tag corresponding to a true subject in a front sentence, and add a subject to a back sentence by inserting the identified combination of words immediately after a conjunctive adverb. Meanwhile, when there is no combination of words matched to a subject tag corresponding to a true subject in a front sentence, the processor 400 may identify a combination of words matched to a subject tag corresponding to the true subject in a sentence immediately preceding the front sentence, and add a subject to a back sentence by inserting the identified combination of words immediately after the conjunctive adverb.

Meanwhile, the processor 400 may identify a short sentence from the original text, determine whether the identified short sentence includes a combination of morphemes matched to a subject tag corresponding to a true subject, identify a combination of morphemes matched to a subject tag corresponding to a true subject in the immediately previous sentence when the short sentence does not include the combination of morphemes matched to the subject tag corresponding to the true subject, and add a subject to the corresponding short sentence by inserting the identified combination of morphemes into the beginning of the corresponding short sentence.

As described above, the present invention may simplify a sentence by converting a complex sentence into short sentences, and generate a refined short sentence by supplementing omitted sentence components, thereby increasing purity of conversion into English or training data for embedding.

As described above, according to an embodiment of the present invention, it is possible to generate a word embedding library by segmenting original text by morpheme, combining the segmented morphemes step by step according to a preset rule, matching a tag to a combination of step-by-step morphemes according to a morphological attribute or a syntactic attribute of the combination of step-by-step morphemes, and classifying the morphemes included in the original text based on the tag matched to the combination of step-by-step morphemes.

Implementations described herein may be implemented in, for example, a method or process, an apparatus, a software program, a data stream, or a signal. Although discussed only in the context of a single form of implementation (e.g., discussed only as a method), implementations of the discussed features may also be implemented in other forms (e.g., an apparatus or a program). The apparatus may be implemented in suitable hardware, software, firmware, and the like. A method may be implemented in an apparatus such as a processor, which generally refers to a computer, a microprocessor, an integrated circuit, a processing device including a programmable logic device, or the like. Processors also include communication devices such as a computer, a cell phone, and a portable/personal digital assistant ("PDA"), and other devices that facilitate communication of information between end-users.

According to one aspect of the present invention, it is possible to generate a word embedding library by segmenting original text by morpheme, combining the segmented morphemes step by step according to a preset rule, matching a tag to a combination of step-by-step morphemes according to a morphological attribute or a syntactic attribute of the combination of step-by-step morphemes, and classifying the morphemes included in the original text based on the tag matched to the combination of step-by-step morphemes.

According to another aspect of the present invention, it is possible to divide a sentence included in original text by sentence component.

According to another aspect of the present invention, it is possible to extract a tagging error included in original text and correct the extracted tagging error.

According to another aspect of the present invention, it is possible to improve accuracy when converting into English and increase purity of training data for embedding by converting a complex sentence included in original text into short sentences to simplify a sentence and supplementing omitted sentence components to generate a refined short sentence.

According to another aspect of the present invention, it is possible to classify a word embedding library according to a subject and a style of original text.

Although the present invention has been described with reference to embodiments shown in the accompanying drawings, it is only exemplary. It will be understood by those skilled in the art that various modifications and other equivalent exemplary embodiments are possible from the present invention. Accordingly, the true technical scope of the present invention is to be determined by the spirit of the appended claims.

What is claimed is:

1. An apparatus and a method for generating a word embedding library, comprising:
   an input interface; and
   a processor,
   wherein the processor is configured to receive original text composed of Hangul through the input interface,
   segment the original text by morpheme and combine segmented morphemes step-by-step according to a preset rule,
   match a tag to a combination of step-by-step morphemes according to a morphological attribute or a syntactic attribute of the combination of step-by-step morphemes, and
   generate a word embedding library by classifying the morphemes included in the original text based on the tag matched to the combination of step-by-step morphemes,
   a display configured to output various results calculated in a process of generating the word embedding library, and
   a memory configured to pre-store various data necessary for generating the word embedding library.

2. The apparatus of claim 1, wherein the processor is configured to:
   match a part-of-speech tag to the segmented morpheme according to a part of speech when matching the tag to the combination of step-by-step morphemes;
   identify, from the original text, a noun type word defined by a first morpheme whose part of speech is a first type or a combination of the first morpheme and another morpheme based on the part-of-speech tag;
   determine a type of the noun type word based on the part-of-speech tag matched to the noun type word; and
   match a noun type tag to the noun type word according to the type of the noun type word.

3. The apparatus of claim 2, wherein the processor is configured to:
   identify, from the original text, a compound noun type word defined by a combination of a noun type word and a first type noun type word based on the noun type tag; and
   match a compound noun type tag to the compound noun type word when matching the tag to the combination of step-by-step morphemes.

4. The apparatus of claim 3, wherein the processor is configured to:
   identify, from the original text, a basic descriptive word defined by a second morpheme whose part of speech is a second type or a combination of the second morpheme and another morpheme based on the part-of-speech tag when matching the tag to the combination of step-by-step morphemes;
   determine a type of the basic descriptive word based on the part-of-speech tag matched to the second morpheme;
   match the basic descriptive tag to the basic descriptive word according to the type of the basic descriptive word;
   identify a supplementary descriptive word defined by a basic descriptive word located in front of the basic descriptive word from the original text based on the basic descriptive tag;
   match a supplementary descriptive tag to the supplementary descriptive word;
   identify a descriptive word defined by a combination of the basic descriptive word and the supplementary descriptive word from the original text based on the basic descriptive tag and the supplementary descriptive tag; and
   match a descriptive tag to the descriptive word according to the type of the basic descriptive word included in the descriptive word.

5. The apparatus of claim 4, wherein the processor is configured to:
   identify, from the original text, a noun phrase defined by a combination of a descriptive word and a third morpheme whose part of speech is a third type based on the part-of-speech tag and the descriptive tag when matching the tag to the combination of step-by-step morphemes;

determine a type of the noun phrase based on the part-of-speech tag matched to the descriptive tag and the third morpheme; and
match a noun phrase tag to the noun phrase according to the type of the noun phrase.

6. The apparatus of claim 5, wherein the processor is configured to:
identify a compound noun phrase defined by a combination of a noun phrase and another noun phrase from the original text based on the noun phrase tag when matching the tag to the combination of step-by-step morphemes; and
match a compound noun phrase tag to the compound noun phrase.

7. The apparatus of claim 6, wherein the processor is configured to:
identify, from the original text, a subordinate component of a noun phrase defined by a combination of a compound noun type word, a noun type word, or a noun phrase and a fourth morpheme whose part of speech is a fourth type based on the noun phrase tag and the part-of-speech tag when matching the tag to the combination of step-by-step morphemes;
determine the type of the basic descriptive word based on the part-of-speech tag matched to the second morpheme;
match a subordinate component tag to the subordinate component according to a type of the subordinate component;
identify a noun clause defined by a combination of a subordinate component and a noun phrase from the original text based on the noun phrase tag and the subordinate component tag;
determine a type of the noun clause based on the noun phrase tag; and
match a noun clause tag to the noun clause according to the type of the noun clause.

8. The apparatus of claim 7, wherein the processor is configured to:
identify, from the original text, a compound noun phrase defined by a combination of a noun phrase and a noun clause or a combination of the noun clause and another noun clause based on the noun phrase tag and the noun clause tag when matching the tag to the combination of the step-by-step morphemes; and
match the compound noun clause tag to the compound noun clause.

9. The apparatus of claim 8, wherein the processor is configured to:
identify a noun defined by a compound noun clause, a noun clause, a compound noun phrase, a noun phrase, a compound noun type word, a noun type word, or a morpheme capable of independently performing a nominal role in a sentence when matching the tag to the combination of the step-by-step morphemes; and
match a noun tag to the noun.

10. The apparatus of claim 9, wherein the processor is configured to:
identify a predicate defined by a combination of a descriptive word and a fifth morpheme whose part of speech is a fifth type from the original text based on the descriptive tag and the part-of-speech tag and the descriptive tag when matching the tag to the combination of step-by-step morphemes;
determine a type of the predicate; and
match a predicate tag to the predicate according to the type of the predicate.

11. A method of generating a word embedding library, comprising:
receiving, by a processor, original text composed of Hangul through an input interface;
segmenting, by the processor, the original text by morpheme, combining segmented morphemes step by step according to a preset rule, and matching a tag to a combination of step-by-step morphemes according to a morphological attribute or a syntactic attribute of the combination of step-by-step morphemes; and
generating, by the processor, a word embedding library by classifying the morphemes included in the original text based on the tag matched to the combination of step-by-step morphemes.

12. The method of claim 11, wherein the matching of the combination of the step-by-step morphemes includes:
matching a part-of-speech tag to the segmented morpheme according to a part of speech;
identifying, from the original text, a noun type word defined by a first morpheme whose part of speech is a first type or a combination of the first morpheme and another morpheme based on the part-of-speech tag;
determining a type of the noun type word based on the part-of-speech tag matched to the noun type word; and
matching a noun type tag to the noun type word according to the type of the noun type word.

13. The method of claim 12, wherein the matching of the combination of the step-by-step morphemes includes:
identifying a compound noun type word defined by a combination of a noun type word and a first type noun type word from the original text based on the noun type tag; and
matching a compound noun type tag to the compound noun type word.

14. The method of claim 13, wherein the matching of the combination of the step-by-step morphemes includes:
identifying, from the original text, a basic descriptive word defined by a second morpheme whose part of speech is a second type or a combination of the second morpheme and another morpheme based on the part-of-speech tag;
determining the type of the basic descriptive word based on the part-of-speech tag matched to the second morpheme;
matching the basic descriptive tag to the basic descriptive word according to the type of the basic descriptive word;
identifying a supplementary descriptive word defined by a basic descriptive word located in front of the basic descriptive word from the original text based on the basic descriptive tag;
matching a supplementary descriptive tag to the supplementary descriptive word;
identifying a descriptive word defined by a combination of the basic descriptive word and the supplementary descriptive word from the original text based on the basic descriptive tag and the supplementary descriptive tag; and
matching a descriptive tag to the descriptive word according to the type of the basic descriptive word included in the descriptive word.

15. The method of claim 14, wherein the matching of the combination of the step-by-step morphemes includes:
identifying a noun phrase defined by a combination of a descriptive word and a third morpheme whose part of speech is a third type from the original text based on the part-of-speech tag and the descriptive tag;

determining a type of the noun phrase based on the part-of-speech tag matched to the descriptive tag and the third morpheme; and matching a noun phrase tag to the noun phrase according to the type of the noun phrase.

16. The method of claim 15, wherein the matching of the combination of the step-by-step morphemes includes:

identifying a compound noun phrase defined by a combination of a noun phrase and another noun phrase from the original text based on the noun phrase tag; and matching a compound noun phrase tag to the compound noun phrase.

17. The method of claim 16, wherein the matching of the combination of the step-by-step morphemes includes:

identifying, from the original text, a subordinate component of a noun phrase defined by a combination of a compound noun type word, a noun type word, or a noun phrase and a fourth morpheme whose part of speech is a fourth type based on the noun phrase tag and the part-of-speech tag;

determining the type of the basic descriptive word based on the part-of-speech tag matched to the second morpheme;

matching a subordinate component tag to the subordinate component according to a type of the subordinate component;

identifying a noun clause defined by a combination of a subordinate component and a noun phrase from the original text based on the noun phrase tag and the subordinate component tag;

determining a type of the noun clause based on the noun phrase tag; and matching a noun clause tag to the noun clause according to the type of the noun clause.

18. The method of claim 17, wherein the matching of the combination of the step-by-step morphemes includes:

identifying a compound noun phrase defined by a combination of a noun phrase and a noun clause or a combination of the noun clause and another noun clause from the original text based on the noun phrase tag and the noun clause tag; and matching the compound noun clause tag to the compound noun clause.

19. The method of claim 18, wherein the matching of the combination of the step-by-step morphemes includes:

identifying a noun defined by a compound noun clause, a noun clause, a compound noun phrase, a noun phrase, a compound noun type word, a noun type word, or a morpheme capable of independently performing a nominal role in a sentence; and matching a noun tag to the noun.

20. The method of claim 19, wherein the matching of the combination of the step-by-step morphemes includes:

identifying, from the original text, a predicate defined by a combination of a descriptive word and a fifth morpheme whose part of speech is a fifth type based on the descriptive tag and the part-of-speech tag and the descriptive tag;

determining a type of the predicate; and matching a predicate tag to the predicate according to the type of the predicate.

* * * * *